(12) United States Patent
Kobayashi

(10) Patent No.: US 10,609,316 B2
(45) Date of Patent: Mar. 31, 2020

(54) IMAGING DEVICE AND IMAGING SYSTEM

(71) Applicant: CANON KABUSHIKI KAISHA, Tokyo (JP)

(72) Inventor: Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/892,900

(22) Filed: Feb. 9, 2018

(65) Prior Publication Data

US 2018/0249110 A1 Aug. 30, 2018

(30) Foreign Application Priority Data

Feb. 24, 2017 (JP) .................................. 2017-033698

(51) Int. Cl.
| | |
|---|---|
| H04N 3/14 | (2006.01) |
| H04N 5/335 | (2011.01) |
| H04N 5/3745 | (2011.01) |
| G02B 7/28 | (2006.01) |
| H04N 5/232 | (2006.01) |
| H04N 5/378 | (2011.01) |
| H04N 5/369 | (2011.01) |
| G02B 7/34 | (2006.01) |

(52) U.S. Cl.
CPC ............ *H04N 5/3745* (2013.01); *G02B 7/28* (2013.01); *G02B 7/34* (2013.01); *H04N 5/23245* (2013.01); *H04N 5/36961* (2018.08); *H04N 5/378* (2013.01); *H04N 5/37457* (2013.01)

(58) Field of Classification Search
CPC .............. H04N 5/3696; H04N 5/3745; H04N 5/37457; H04N 5/378; H04N 5/37452; H04N 5/37455

See application file for complete search history.

(56) References Cited

U.S. PATENT DOCUMENTS

| | | |
|---|---|---|
| 7,990,440 B2 | 8/2011 | Kobayashi et al. |
| 8,710,558 B2 | 4/2014 | Inoue et al. |
| 8,835,828 B2 | 9/2014 | Kobayashi |
| 8,884,391 B2 | 11/2014 | Fudaba et al. |
| 9,264,641 B2 | 2/2016 | Kobayashi |
| 9,305,954 B2 | 4/2016 | Kato et al. |
| 9,357,122 B2 | 5/2016 | Kususaki et al. |
| 9,407,847 B2 | 8/2016 | Maehashi et al. |
| 9,426,398 B2 | 8/2016 | Ohshitanai |
| 9,438,828 B2 | 9/2016 | Itano et al. |
| 9,509,931 B2 | 11/2016 | Kobayashi et al. |

(Continued)

FOREIGN PATENT DOCUMENTS

| | | |
|---|---|---|
| JP | 2014-216795 A | 11/2014 |
| JP | 2016-102838 A | 6/2016 |

*Primary Examiner* — Kelly L Jerabek
(74) *Attorney, Agent, or Firm* — Venable LLP

(57) ABSTRACT

An imaging device as an embodiment includes: plurality of pixels arranged in a matrix, each of the plurality of pixels comprising a plurality of photoelectric conversion units; a plurality of signal lines provided on each column of the plurality of pixels; a plurality of readout circuits provided on each the column and configured to read out signals based on charges of the plurality of photoelectric conversion units via the plurality of signal lines; and a control circuit configured to control the plurality of readout circuits associated with one column individually to be an operating state and a non-operating state.

33 Claims, 21 Drawing Sheets

(56) References Cited

U.S. PATENT DOCUMENTS

| | | | |
|---|---|---|---|
| 9,602,752 B2 | 3/2017 | Kobayashi et al. | |
| 9,762,840 B2* | 9/2017 | Yamazaki | H04N 5/341 |
| 9,769,404 B2 | 9/2017 | Ohshitanai | |
| 10,347,679 B2* | 7/2019 | Kato | G02B 7/34 |
| 2011/0080493 A1* | 4/2011 | Kono | H01L 27/14609 |
| | | | 348/222.1 |
| 2011/0242388 A1* | 10/2011 | Watanabe | H01L 27/14609 |
| | | | 348/308 |
| 2012/0105695 A1* | 5/2012 | Iida | H03G 5/28 |
| | | | 348/301 |
| 2012/0175503 A1 | 7/2012 | Kuroda et al. | |
| 2013/0140440 A1 | 6/2013 | Kobayashi | |
| 2013/0229543 A1* | 9/2013 | Hashimoto | H04N 5/35545 |
| | | | 348/222.1 |
| 2013/0229557 A1* | 9/2013 | Hashimoto | H04N 5/3745 |
| | | | 348/301 |
| 2016/0111469 A1 | 4/2016 | Suzuki | |
| 2016/0227141 A1 | 8/2016 | Kobayashi et al. | |
| 2017/0155862 A1 | 6/2017 | Kobayashi et al. | |

* cited by examiner

IMAGING DEVICE AND IMAGING SYSTEM

BACKGROUND OF THE INVENTION

Field of the Invention

The present invention relates to an imaging device and an imaging system.

Description of the Related Art

Conventionally, imaging devices that can read out a signal used for image generation and a signal used for focus detection are known. Japanese Patent Application Laid-Open No. 2016-102838 discloses an imaging device that includes a pixel having a pair of photoelectric conversion units, a first output unit that outputs a signal used for image generation, and a second output unit that outputs a signal used for focus detection. This imaging device further includes a stop control unit that stops the output of an image signal from the first output unit or the output of a focus detection signal from the second output unit in accordance with an operating situation.

However, the imaging device disclosed in Japanese Patent Application Laid-Open No. 2016-102838 performs readout of an image signal and readout of a focus detection signal in the same manner for all the columns. Thus, not all the readout operations are optimal for respective columns.

SUMMARY OF THE INVENTION

An imaging device according to one embodiment of the present invention has a plurality of pixels arranged in a matrix, each of the plurality of pixels comprising a plurality of photoelectric conversion units; a plurality of signal lines provided on each column of the plurality of pixels; a plurality of readout circuits provided on each the column and configured to read out signals based on charges of the plurality of photoelectric conversion units via the plurality of signal lines; and a control circuit configured to control the plurality of readout circuits associated with one column individually to be an operating state and a non-operating state of.

Further features of the present invention will become apparent from the following description of exemplary embodiments with reference to the attached drawings.

DESCRIPTION OF THE EMBODIMENTS

Figure 1:
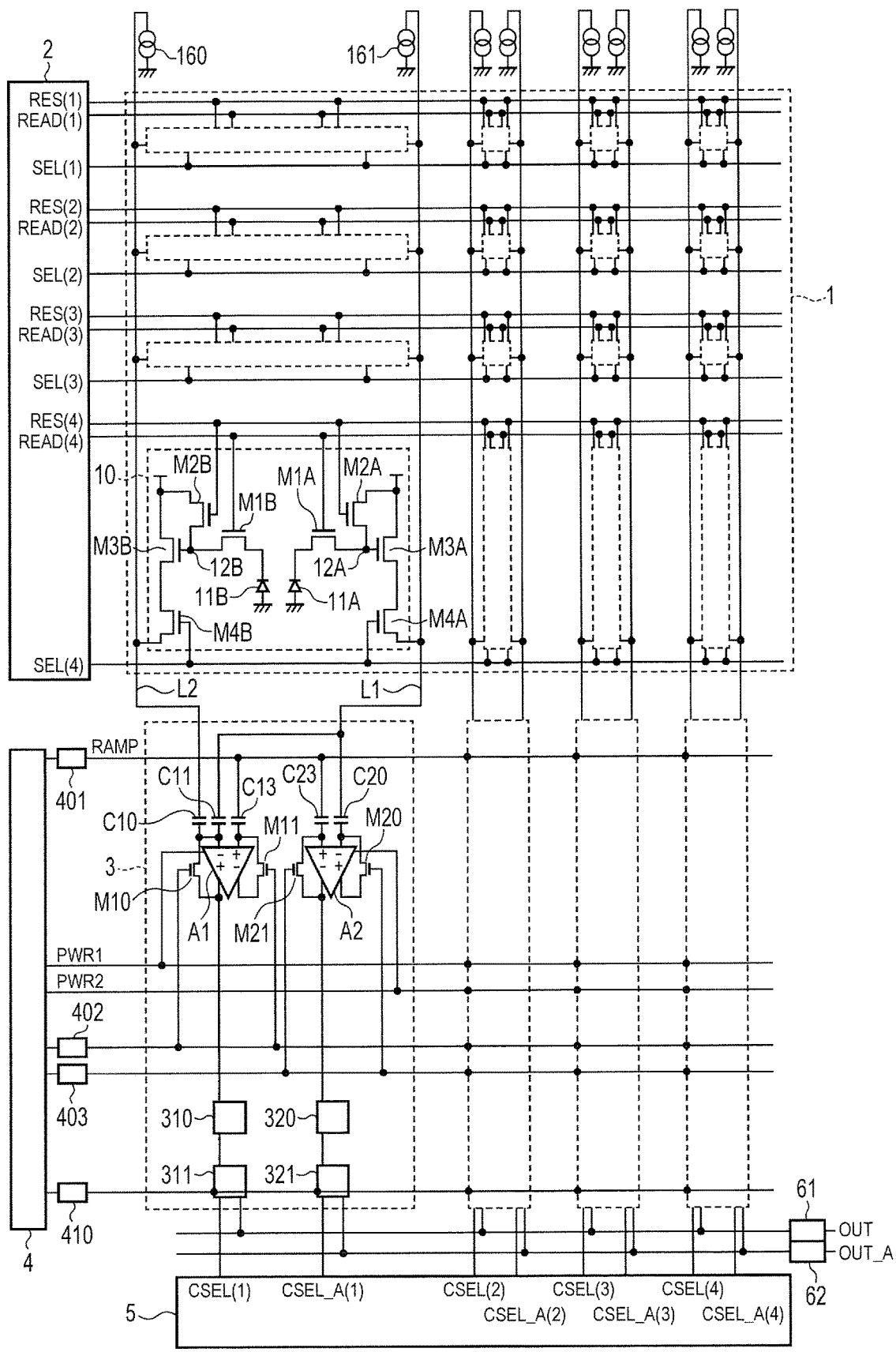
FIG. 1 is a block diagram of an imaging device of a first embodiment.

Embodiments of the present invention will be described below. Each imaging device of first to thirteenth embodiments described later has a plurality of pixel arranged in a matrix having a plurality of photoelectric conversion units and a plurality of readout circuits for reading out signals based on charges of the photoelectric conversion units via signal lines provided on respective columns. Each of the readout circuits is able to read out an image signal and a focus detection signal based on signals of the plurality of photoelectric conversion units. Further, each of the readout circuits can be separately controlled by a control circuit, which can realize optimal control in accordance with the operation mode of the imaging device.

In the imaging devices of the first to fifth embodiments of the present invention, each pixel may include first and second photoelectric conversion units, first and second amplification transistors, and first and second selection transistors. The first amplification transistor can output a first signal based on charges of the first photoelectric conversion unit to a first signal line, and the second amplification transistor can output a second signal based on charges of the second photoelectric conversion unit to a second signal line. A first readout circuit can read out an image signal that is an addition signal of the first signal output to the first signal line and the second signal output to the second signal line. Further, a second readout circuit can read out a focus detection signal that is either the first signal or the second signal and can read out an image signal.

Further, the imaging devices of the sixth to ninth embodiments of the present invention, each pixel includes an amplification transistor common to the first and second photoelectric conversion units, the first selection transistor provided between the amplification transistor and the first signal line, and the second selection transistor provided between the amplification transistor and the second signal line. The amplification transistor can output, to the first signal line and the second signal line, a focus detection signal based on either charges of the first photoelectric conversion unit or charges of the second photoelectric conversion unit or an image signal obtained by adding charges of the first photoelectric conversion unit and charges of the second photoelectric conversion unit. That is, an image signal and a focus detection signal can be obtained from a pixel. By using the first signal line and the second signal line to read out an image signal and a focus detection signal, various readout modes can be realized.

Furthermore, in the imaging device of the tenth embodiment of the present invention, each pixel includes an amplification transistor and a selection transistor common to the first photoelectric conversion unit and the second photoelectric conversion unit. The amplification transistor can output a focus detection signal based on either charges of the first photoelectric conversion unit or charges of the second photoelectric conversion unit or an image signal obtained by adding charges of the first photoelectric conversion unit and charges of the second photoelectric conversion unit. Each pixel can output a focus detection signal or an image signal to a single signal line.

In any of the embodiments, various readout modes of an image signal and a focus detection signal can be realized without using a digital adder. It is therefore possible to perform the optimal readout without increasing the circuit size. Further, each of the readout circuits can be switched to an operating state or a non-operating state by the control circuit, and thereby the optimal power management can be realized for each readout mode.

Preferred embodiments of the present invention will now be described in detail in accordance with the accompanying drawings. The present invention is not limited to the embodiments described below. For example, a part of the features of any of the embodiments below may be added to another embodiment or may be replaced with a part of the features of another embodiment.

First Embodiment

FIG. 1 is a block diagram of an imaging device of the present embodiment. The imaging device is, for example, a CMOS image sensor, and has a pixel unit 1, a vertical scanning circuit 2, a column circuit 3, a control circuit 4, a horizontal scanning circuit 5, a RAMP signal generation circuit 401, reset signal generation circuits 402 and 403, a counter 410, signal processing circuits 61 and 62, and current sources 160 and 161.

The pixel 1 has a plurality of pixels 10 arranged in a matrix, and each of the pixels 10 has a pair of photoelectric conversion units 11A and 11B that generate and accumulate charges in accordance with an incident light. Note that, in the present specification, the row direction corresponds to the horizontal direction in the drawings and the column direction corresponds to the vertical direction in the drawings. Micro lenses and color filters may be arranged over the pixels 10. The color filters are primary color filters of red, blue, and green, for example, and provided over respective pixels in accordance with the Bayer array. Some of the pixels 10 are shielded from a light as optical black pixels (OB pixels).

The pixel 10 includes first and second photoelectric conversion units 11A and 11B, first and second transfer transistors M1A and M1B, first and second floating diffusion regions 12A and 12B, first and second reset transistors M2A and M2B, first and second amplification transistors M3A and M3B, and first and second selection transistors M4A and M4B. In the following description, an example in which transistors of the pixel 10 are N-channel MOS transistors is illustrated. Each of the first photoelectric conversion unit 11A and the second photoelectric conversion unit 11B is formed of a photodiode, for example, and performs photoelectric conversion from an incident light and accumulation of charges. Note that each of the photoelectric conversion units 11A and 11B is not limited to a photodiode, and may be any material as long as it causes a photoelectric effect. A common micro lens is provided over the photoelectric conversion units 11A and 11B, and a light converged by the micro lens enters the photoelectric conversion units 11A and 11B. In a planar view, the photoelectric conversion units 11A and 11B are arranged overlapping with a single common micro lens. In such a way, the two photoelectric conversion units 11A and 11B are pupil-divided. Note that the number of photoelectric conversion units of the pixel 10 is not limit to two, but may be three or more.

The transfer transistors M1A and M1B are provided corresponding to the photoelectric conversion units 11A and 11B, and a drive pulse READ is applied to respective gates thereof. When the drive pulse READ is at a high level, the transfer transistors M11A and M11B are in an on-state (conduction state), and signals of the photoelectric conversion units 11A and 11B are transferred to the floating diffusion regions 12A and 12B, which are input nodes of the corresponding amplification transistors M3A and M3B, respectively. Further, the drive pulse READ is at a low level, the transfer transistors M1A and M1B are in an off-state (non-conduction state). Turning on or off of the transfer transistors M1A and M1B allows charges of the photoelectric conversion units 11A and 11B to be transferred to the floating diffusion regions 12A and 12B, respectively. The amplification transistors M3A and M3B output signals based on charges transferred to the floating diffusion regions 12A and 12B to column signal lines L1 and L2, respectively. Each of the amplification transistors M3A and M3B can form an amplifier circuit such as a source follower circuit, a source grounded circuit, a differential amplifier circuit, or a comparator.

The sources of the reset transistors M2A and M2B are connected to the floating diffusion regions 12A and 12B, respectively, and a drive pulse RES is applied to the gates thereof. When the drive pulse RES is at a high level, the reset transistors M2A and M2B are in an on-state, and a reset voltage is supplied to the floating diffusion regions 12A and 12B. The selection transistor M4A is provided between the amplification transistor M3A and the column signal line L1, the selection transistor M4B is provided between the amplification transistor M3B and the column signal line L2, and a drive pulse SEL is applied to the gates of the selection transistors M4A and M4B. When the drive pulse SEL is at a high level, the amplification transistor M3A and the column signal line L1 are electrically conducted, and the amplification transistor M3B and the column signal line L2 are electrically conducted.

The column signal lines L1 and L2 are provided for each column of the pixels 10. A current source 161 is electrically connected to the column signal line L1, and a current source 160 is electrically connected to the column signal line L2. The current sources 160 and 161 supply bias currents to the sources of the amplification transistors M3A and M3B via the column signal lines L1 and L2, respectively. That is, in the present embodiment, each of the amplification transistors M3A and M3B forms a source follower circuit.

The vertical scanning circuit 2 is formed of a shift resistor, a gate circuit, a buffer circuit, and the like and outputs drive pulses on a row basis based on a vertical synchronization signal, a horizontal synchronization signal, a clock signal, and the like. The drive pulses are supplied to respective gates of the transfer transistors M1A and M1B, the reset transistors M2A and M2B, and the selection transistors M4A and M4B on each row. The drive pulses may be supplied on a row basis sequentially or at random.

Each of the column circuits 3 reads out a pixel signal from the pixel 10 and performs analog-to-digital (AD) conversion on the pixel signal. The column circuit 3 is formed including two readout circuits. The first readout circuit has a comparator A1, reset switches M10 and M11, input capacitors C10, C11, and C13, a pulse generation circuit 310, and a digital memory 311. The first readout circuit reads out an image signal in which a first signal based on charges of the photoelectric conversion unit 11A and a second signal based on charges of the photoelectric conversion unit 11B are added and performs AD conversion thereof. The second readout circuit has a comparator A2, reset switches M20 and M21, input capacitors C20 and C23, a pulse generation circuit 320, and a digital memory 321. The second readout circuit reads out a pixel signal in accordance with charges of the photoelectric conversion unit 11A, that is, a focus detection signal and performs AD conversion thereof.

Each of the comparators A1 and A2 is formed of a differential amplifier circuit and outputs a high-level signal or a low-level signal in accordance with a comparison result of an input signal and a RAMP signal. In the comparator A1, the inverting input terminal (first input terminal) is connected to the column signal line L2 via the input capacitor C10 and connected to the column signal line L1 via the input capacitor C11. That is, an addition signal of a signal from the column signal line L1 and a signal from the column signal line L2 is input to the inverting input terminal of the comparator A1. The RAMP signal is input to the non-inverting input terminal (second input terminal) of the comparator A1 via the input capacitor C13. The comparator A1 compares the addition signal with the RAMP signal and outputs a high-level or low-level comparison signal. The reset switch M10 is provided between the inverting input terminal and the non-inverting input terminal of the comparator A1, and the reset switch M11 is provided between the non-inverting input terminal and the inverting input terminal of the comparator A1. A reset signal from the reset signal generation circuit 402 is applied to the gates of the reset switches M10 and M11.

In the comparator A2, the inverting input terminal is connected to the column signal line L1 via the input capacitor C20, and the RAMP signal generation circuit 401 is connected to the non-inverting input terminal via the input capacitor C23. The reset switch M21 is provided between the inverting input terminal and the non-inverting input terminal, and the reset switch M11 is provided between the non-inverting input terminal and the inverting input terminal. A reset signal from the reset signal generation circuit 403 is applied to the gates of the reset switches M20 and M21.

The operation states of the comparators A1 and A2 are controlled by control signals PWR1 and PWR2, respectively. The control signal PWR1 is applied to the gate of the current source forming the comparator A1, for example, and when the control signal PWR1 becomes high level, a drive current flows in the comparator A1, and the comparator A1 enters an operating state. When the control signal PWR1 becomes low level, the drive current is stopped or reduced below a predetermined threshold, and the comparator A1 enters a non-operating state. In the following description, a non-operating state may include not only a state where the drive current is stopped but also a state where the drive current is limited. The operation state of the comparator A2 is controlled by the control signal PWR2 different from the control signal PWR1 and can be controlled independently of the comparator A1. For example, when only the image signal is read out, the consumption current can be reduced by outputting a high-level control signal PWR1 and further a low-level control signal PWR2. As the configuration for independent control of the comparators A1 and A2, a wiring which supplies the control signal PWR1 and a wiring which supplies the control signal PWR2 are electrically separated, for example. Specifically, two different buffers drive the wiring which supplies the control signal PWR1 and the wiring which supplies the control signal PWR2.

The pulse generation circuits 310 and 320 output a shot of pulse when the outputs of the comparators A1 and A2 are inverted. In response to detecting a shot of pulse, the digital memories 311 and 321 hold the count value of the counter 410. In accordance with the potentials of pixel signals input to the comparators A1 and A2, the time period from the time when the potential of the RAMP signal starts decreasing to the time when the outputs of the comparators A1 and A2 are inverted changes. Each count value held in the digital memories 311 and 321 represents the amplitude of the potential of the pixel signal.

The control circuit 4 functions as a timing generator that generates various control signals or drive signals based on a clock, a synchronization signal, and the like. The control circuit 4 controls the RAMP signal generation circuit 401, the reset signal generation circuits 402 and 403, and the counter 410 and outputs the control signals PWR1 and PWR2. The RAMP signal generation circuit 401 generates the RAMP signal (reference signal) that decreases with time based on a trigger signal from the control circuit 4. The counter 410 performs count-up or countdown in response to the trigger signal. The reset signal generation circuits 402 and 403 supply control signals via the control lines to respective gates of the reset switches M10, M11, M20, and M21. The reset signal generation circuits 402 and 403 may include a drive circuit that drives the control lines and the gates of the reset switches M10, M11, M20, and M21 on each column.

The horizontal scanning circuit 5 is formed of a shift resistor, a gate circuit, and the like and sequentially scans the plurality of column circuits 3. That is, the horizontal scanning circuit 5 reads out digital signals from the digital memories 311 and 321 of the column circuits 3 by sequentially switching the drive pulses CSEL and CSEL_A on respective columns to a high level. Each of the signal processing circuits 61 and 62 has a differential amplifier circuit, a buffer circuit, a clamp circuit, or the like and outputs a signal read out from the column circuit 3 to the outside of the imaging device. An external image processing circuit can calculate a difference between an image signal and a focus detection signal and generate a signal based on charges in the photoelectric conversion unit 11A and a signal based on charges in the photoelectric conversion unit 11B.

With respect to the general operation of the imaging device configured as described above, the operation of outputting a focus detection signal together with an image signal will be described. First, the vertical scanning circuit 2 outputs a high-level drive pulse SEL(4) and a high-level drive pulse RES(4) to reset charges of the floating diffusion regions 12A and 12B. The vertical scanning circuit 2 then outputs a low-level drive pulse RES(4) to complete the reset operation. A signal in a reset state of the pixel (hereafter, referred to as "signal N") is output to the column signal lines L1 and L2 and input to the input capacitors C10, C11, and C20 of the column circuit 3. After the drive pulse RES(4) becomes low level, that is, after the reset transistors M2A and M2B of the pixel 10 are turned off, a reset noise is contained in the voltages of the floating diffusion regions 12A and 12B. Therefore, the signal N contains this reset noise.

The control circuit 4 switches the reset signals output from the reset signal generation circuits 402 and 403 to a high level and then to a low level, which causes the reset switches M10, M11, M20, and M21 to be turned off from an on-state. Thereby, the signal N of the floating diffusion region 12B is clamped by the input capacitor C10, and the signal N of the floating diffusion region 12A is clamped by the input capacitors C11 and C20. In other words, the difference between the level (potential) of the signal N of the column signal line L2 at this time and the potential at the time of reset of the non-inverting input terminal of the comparator A1 is held at both ends of the input capacitor C10. Similarly, the difference between the level of the signal N of the column signal line L1 at this time and the potential at the time of reset of the non-inverting input terminal of the comparator A1 is held at both ends of the input capacitor C11. Further, the difference between the level (potential) of the RAMP signal output from the RAMP signal generation circuit 401 at this time and the potential at the time of reset of the non-inverting input terminal of the comparator A1 is clamped by the input capacitor C13. Similarly, the difference between the level of the RAMP signal at this time and the potential at the time of reset of the non-inverting input terminal of the comparator A2 is clamped by the input capacitor C20.

Next, the vertical scanning circuit 2 outputs a high-level drive pulse READ and transfers optical charges accumulated in the photoelectric conversion units 11A and 11B to the floating diffusion regions 12A and 12B, respectively. The potentials of the floating diffusion regions 12A and 12B change by a predetermined potential in accordance with the amount of charges. When optical charges are electrons, the potential decreases. The first signal based on charges in the photoelectric conversion unit 11A is output from the amplification transistor M3A to the column signal line L1. The second signal based on charges in the photoelectric conversion unit 11B is output from the amplification transistor M3B to the column signal line L2. A differential signal of the second signal and the signal N is input to the inverting input terminal of the comparator A1 via the input capacitor C10. In addition, a differential signal of the first signal and the signal N is input to the inverting input terminal of the comparator A1 via the input capacitor C11. Here, being input via the input capacitor C10 or C11 means that a potential change of one end of the input capacitor C10 or C11 causes a potential change of the other end of the input capacitor C10 or C11 due to capacitance coupling of the input capacitor C10 or C11. Therefore, the differential signal of the first signal and the signal N and the differential signal of the second signal and the signal N are added at the inverting input terminal of the comparator A1. The differential signal of the first signal and the signal N is input to the inverting input terminal of the comparator A2. Thereby, components of a reset noise occurring at the pixel 10, threshold variation of the amplification transistors M3A and M3B, or the like are removed from the first signal and the second signal. Each of the comparators A1 and A2 outputs a result of comparison of a signal at the inverting input terminal with the RAMP signal.

The RAMP signal generation circuit 401 reduces the voltage of the RAMP signal with time, and the counter 410 performs count-up or countdown. In response to inversion of the outputs of the comparators A1 and A2, the digital memories 311 and 321 hold count values. The count values are sequentially read out by the horizontal scanning circuit 5 and output to the signal processing circuits 61 and 62. In such a way, the AD conversion operations of the image signal and the focus detection signal are performed. The signals held in the digital memories 311 and 321 are sequentially selected by the horizontal scanning circuit 5 and output via the signal processing circuits 61 and 62.

Figure 2:
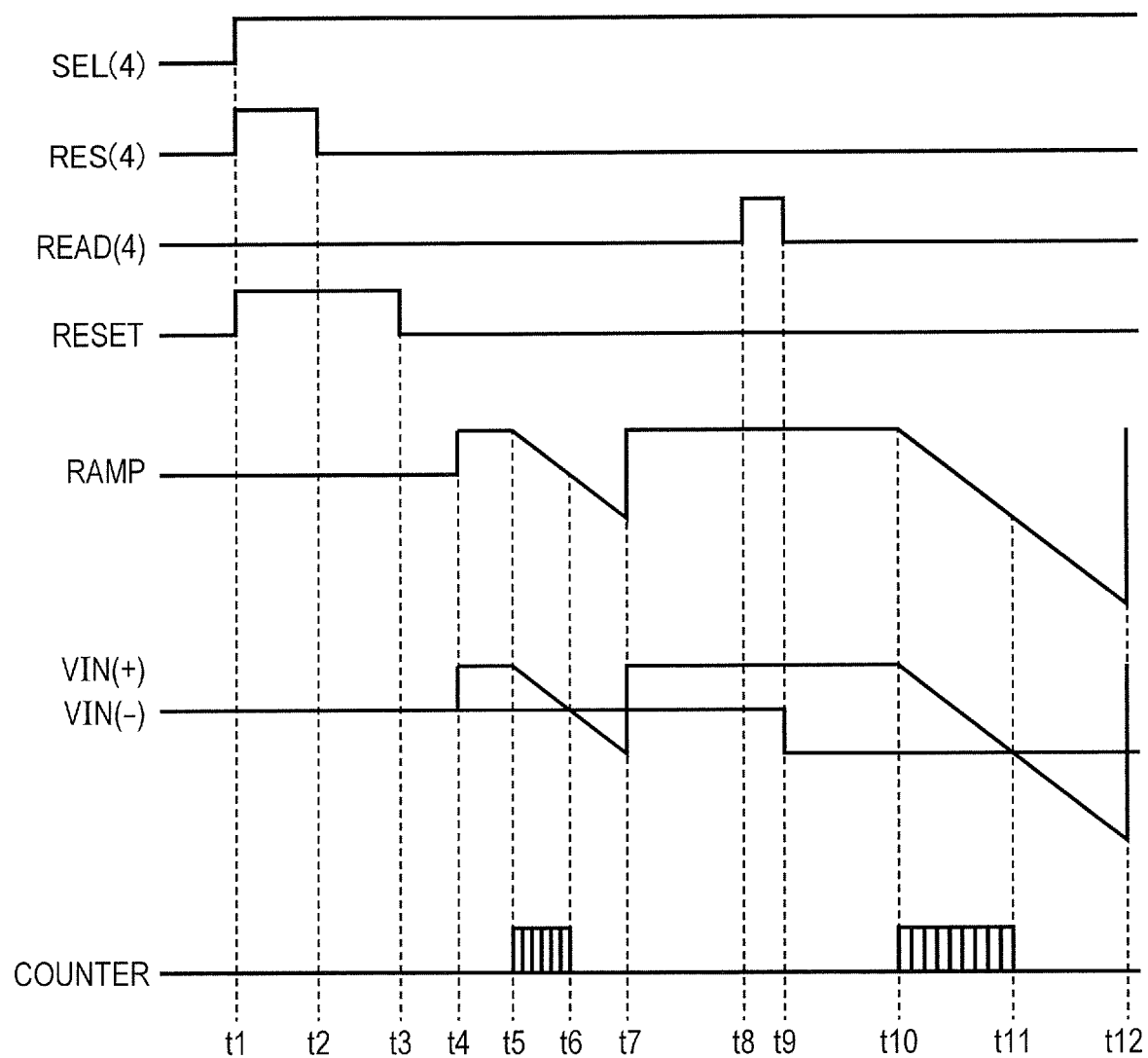
FIG. 2 is a timing chart of the imaging device of the first embodiment.

FIG. 2 is a timing chart illustrating another example of the readout operation of the present embodiment. The following timing chart illustrates the operation of performing AD conversion of a signal at the time of reset and a signal at the time of photoelectric conversion, respectively, and calculating the difference of these two signals.

At the time t1, the vertical scanning circuit 2 outputs a high-level drive pulse SEL(4) to turn on the selection transistors M4A and M4B resulting in a state where a signal of the pixel 10 for one row is ready to be read out. In this state, the drive pulse RES(4) becomes high level, and the reset transistors M2A and M2B are turned on. The floating diffusion regions 12A and 12B are reset to the power source voltage. At the time t2, the drive pulse RES(4) becomes low level, the reset transistors M2A and M2B are turned off, and thereby the reset operation is completed. Then, the signal N in the reset state is output to the column signal lines L1 and L2, respectively. The signal N at the time of reset of the floating diffusion region 12A is input to the input capacitors C11 and C20, and the signal N at the time of reset of the floating diffusion region 12B is input to the input capacitor C10.

Since the reset switches M10, M11, M20, and M21 are in an on-state from the time t1 to t3, the input voltage VIN(−) of the inverting input terminal and the input voltage VIN(+) of the non-inverting input terminal are substantially the same as each other in the comparators A1 and A2, respectively. At this time, the RAMP signal is at a predetermined intermediate level. The level of the RAMP signal at this time corresponds to a level at which the outputs of the comparators A1 and A2 are inverted. That is, once the RAMP signal is then changed to an initial value, the outputs of the comparators A1 and A2 change to a value close to the power source voltage or the ground voltage. Then, when the RAMP signal again reaches the predetermined intermediate level, the outputs of the comparators A1 and A2 are inverted.

At the time t3, the reset switches M10, M11, M20, and M21 are turned off. Thereby, the signal N at the time of reset of the floating diffusion region 12A is clamped by the input capacitors C11 and C20, and the signal N at the time of reset of the floating diffusion region 12B is clamped by the input capacitor C10. Further, each difference between the predetermined intermediate level of the RAMP signal and the voltage of the non-inverting input terminal of the comparator is clamped by the input capacitors C13 and C23. The input voltage VIN(−) at the inverting input terminal of each of the comparators A1 and A2 changes as illustrated in FIG. 2. That is, after the signal N is output, the input voltage VIN(−) is substantially constant until the first signal (a signal based on charges of the photoelectric conversion unit 11A) or the second signal (a signal based on charges of the photoelectric conversion unit 11B) is output. On the other hand, the input voltage VIN(+) at the non-inverting input terminal of each of the comparators A1 and A2 changes in accordance with the signal RAMP.

At the time t4, the RAMP signal generation circuit 401 increases the voltage of the RAMP signal to the initial value.

The input voltage VIN(+) at the non-inverting input terminal of each of the comparators A1 and A2 increases in a similar manner. At the time t5, the RAMP signal generation circuit 401 changes the voltage of the RAMP signal with time. At the same time, the counter 410 starts counting the clock pulse. When the input voltage VIN(+) of the RAMP signal is higher than the input voltage VIN(−), the output of the comparator A1 is at a low level, for example. At the time t6, the input voltage VIN(+) of the RAMP signal becomes lower than the input voltage VIN(−), the outputs of the comparators A1 and A2 are inverted from a low level to a high level. The digital memories 311 and 321 hold the count value of the counter 410 as the signal N at the time of reset. The signal N contains noise components at the time of reset of the reset switches M10, M11, M20, and M21 in addition to noise components of a noise at the time of reset of the pixel 10, threshold variation of the amplification transistors M3A and M3B, or the like. At the time t7, the RAMP signal generation circuit 401 stops the voltage change of the RAMP signal and sets the voltage of the RAMP signal back to the initial value.

At the time t8, the drive pulse READ(4) becomes high level, and the transfer transistors M1A and M1B are turned on. Charges of the photoelectric conversion units 11A and 11B are transferred to the floating diffusion regions 12A and 12B, respectively, and the voltages in accordance with respective charges are output from the amplification transistors M3A and M3B. At the time t9, the drive pulse READ(4) becomes low level, and the transfer transistors M1A and M1B are turned off. Thereby, transfer of charges from the photoelectric conversion units 11A and 11B ends, a signal based on charges of the photoelectric conversion units 11A and 11B is input to the comparator A1, and a signal based on charges of the photoelectric conversion unit 11A is input to the comparator A2.

At the time t10, the RAMP signal generation circuit 401 starts changing the voltage of the RAMP signal, and the counter 410 starts counting the clock pulse. At the time t11, once the input voltage VIN(+) of the RAMP signal becomes lower than the input voltage VIN(−), the outputs of the comparators A1 and A2 are inverted from a low level to a high level. Note that the timings when the outputs of the comparators A1 and A2 are inverted are not always the same as each other. The digital memories 311 and 321 take in the count value of the counter 410 as an image signal and a focus detection signal obtained at the time of photoelectric conversion, respectively. The image signal and the focus detection signal obtained here contain noise components at the time of reset in addition to the signal based on charges at the time of photoelectric conversion. At the time t12, the voltage of the RAMP signal returns to the initial value. Then, an image signal and a focus detection signal from which noise components have been removed can be calculated by subtracting the signal N from the image signal and the focus detection signal, respectively. In such a way, the operation illustrated in FIG. 2 allows for further removal of components of the reset noise of the reset switches M10, M11, M21, and M22, variation of the input offset of the comparators A1 and A2, or the like. Note that, while the example in which AD conversion is performed on only the signal at the time of photoelectric conversion is illustrated in the embodiments described later for the purpose of illustration, AD conversion may be performed on a signal at the time of reset and a signal at the time of photoelectric conversion, respectively, in the same manner as illustrated in the first embodiment, and then correlated double sampling may be performed thereon.

In the present embodiment, respective operation states of the comparator A1 for an image signal and the comparator A2 for a focus detection signal can be separately controlled by the control signals PWR1 and PWR2. For example, when reading out an image signal only, it is possible to reduce the consumption current by causing the comparator A2 to be in a non-operating state. That is, it is possible to separately control the first and second readout circuits for the case of reading out an image signal and the case of reading out an image signal and a focus detection signal, respectively. Furthermore, since no digital adder is used in the imaging device of the present embodiment, the circuit size can be reduced.

Second Embodiment

Figure 3:
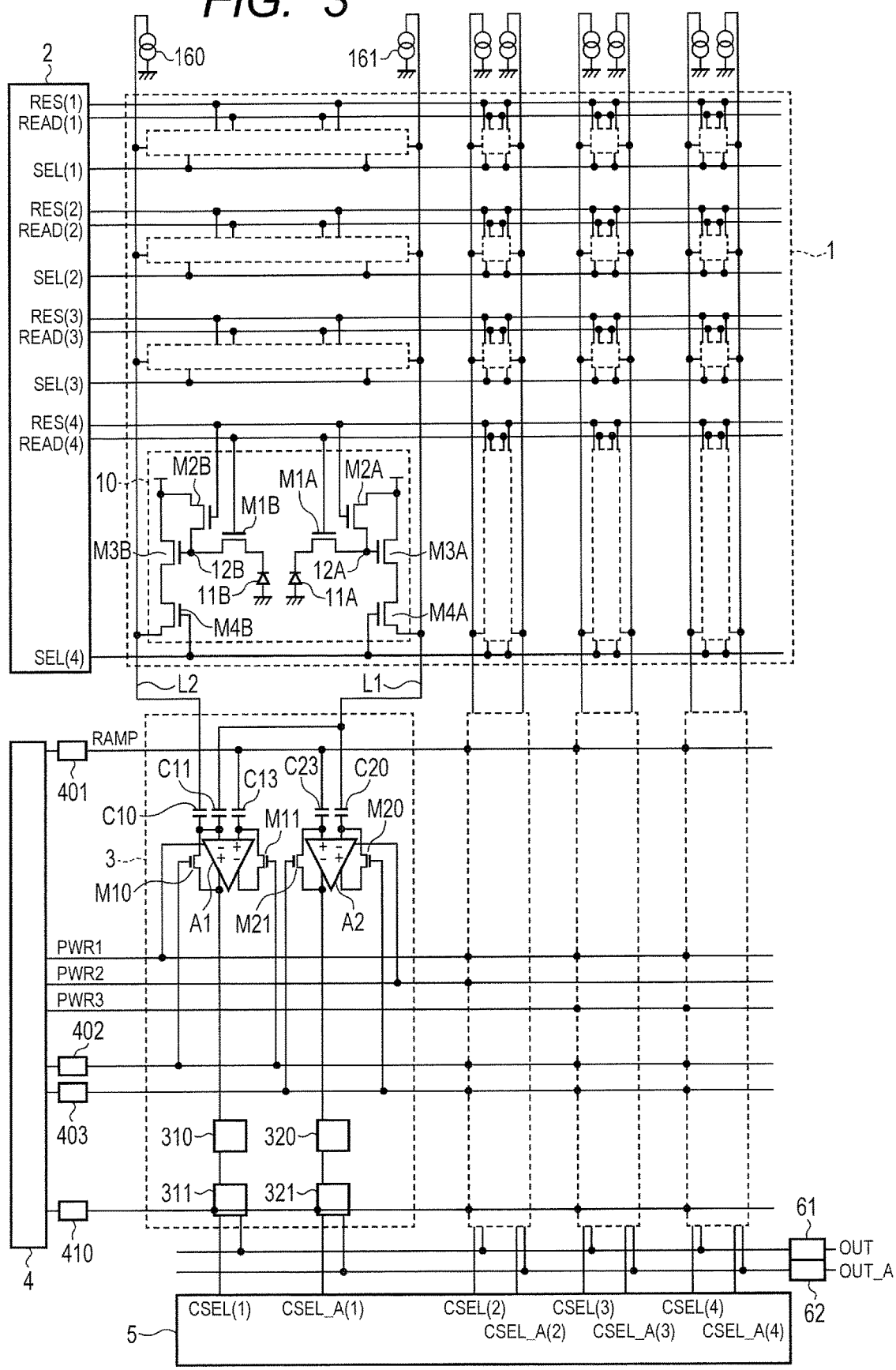
FIG. 3 is a block diagram of an imaging device of a second embodiment.

FIG. 3 is a block diagram of an imaging device of the present embodiment. In the present embodiment, the comparator A2 for a focus detection signal can be controlled by a plurality of control signals. The present embodiment will be described below mainly for the features different from the first embodiment. In FIG. 3, the member having the same function as that in the first embodiment is labeled with the same reference symbol.

The control circuit 4 can output a control signal PWR3 in addition to the control signals PWR1 and PWR2. The control signal PWR2 is supplied to the comparators A2 on the first column and the second column, and the control signal PWR3 is supplied to the comparators A2 on the third column and the fourth column. That is, the operation state of the comparators A2 on the first column and the second column is controlled by the control signal PWR2, and the operation state of the comparators A2 on the third column and the fourth column is controlled by the control signal PWR3. For example, when obtaining focus detection signals in the pixels 10 on the first column and the second column, the control circuit 4 outputs a high-level control signal PWR2 and a low-level control signal PWR3. This allows the comparator A2 on the pixel column used for obtaining a focus detection signal to be in an operating state and the comparators A2 on other pixel columns to be in a non-operating state. When focus detection signals are not necessarily required to be obtained on all the columns, the consumption current can be reduced.

Figure 4A:
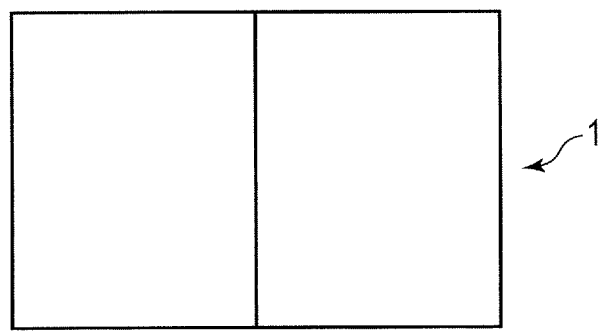
FIG. 4A, FIG. 4B, and FIG. 4C are diagrams illustrating one or more pixel columns for obtaining a signal used for focus detection of the second embodiment.
Figure 4B:
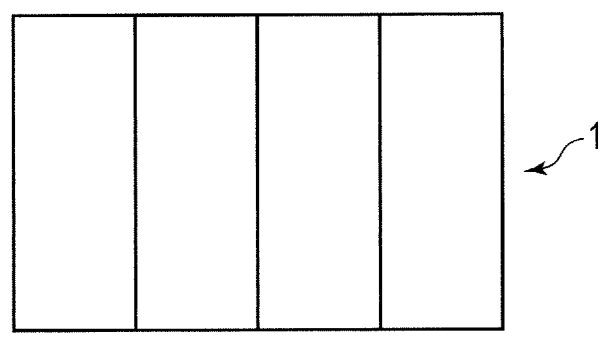
Figure 4C:
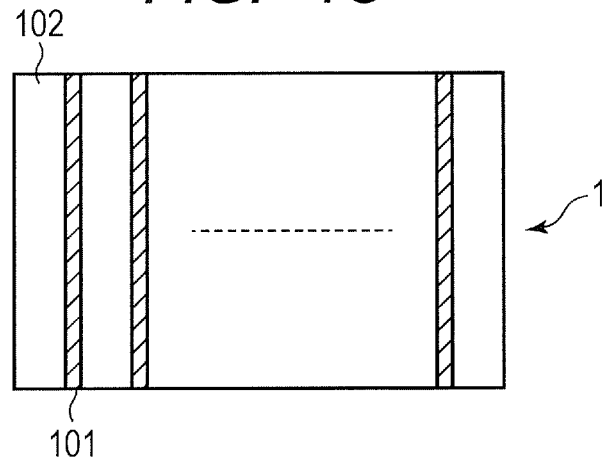

Note that any pixel column can be defined as a pixel column from which a focus detection signal is obtained. FIGS. 4A to 4C illustrate examples of the region from which the focus detection signal is obtained. As illustrated in FIG. 4A, the pixel unit 1 may be divided into two regions: the left region and the right region, and the comparators A2 for the focus detection signal can be independently controlled in respective regions. For example, when a subject light enters the right side in the pixel unit 1 and a focus detection signal is obtained in the right side region, the consumption current can be reduced by causing the comparator A2 in the left side region to be in a non-operating state. Further, by causing the comparator A2 which is not required to operate to be in a non-operating state, noise due to an inversion operation of the comparator A2 can be reduced.

The pixel unit 1 may be divided into a greater number of regions. FIG. 4B illustrates an example in which the pixel unit 1 is divided into four regions. Respective regions are not required to have the same size, that is, not required to include the same number of columns. For example, the region may be divided finer in the center of the pixel unit 1. Note that, in order to independently control the comparators A2 on a region basis, it is preferable to prepare the control signals PWR of the comparators A2 in accordance with the number of regions. In the example of FIG. 4B, four control signals PWR may be supplied to the corresponding comparators A2 in respective regions from the control circuit 4. Further, four logical values may be calculated by outputting two control signals PWR2 and PWR3 from the control circuit 4 and performing logic operation of the control signals PWR2 and PWR3 in respective regions.

FIG. 4C illustrates an example in which pixel columns used for obtaining focus detection signals are arranged in a reduced manner. Pixel columns 101 used for obtaining focus detection signals are arranged every predetermined number of columns, and each pixel column 102 used for obtaining only the image signal is arranged between respective pixel columns 101. In each of the pixel columns 102, the comparator A2 for the focus detection signal can be in a non-operating state. Since the pixel columns 101 are distributed over the entire pixel unit 1, the focus detection signals can be obtained in a wide area of the pixel unit 1. Further, since the pixel columns 101 are arranged in a reduced manner, the number of comparators A2 to be in an operating state can be minimized and thus the consumption current can be further reduced.

Third Embodiment

Figure 5:
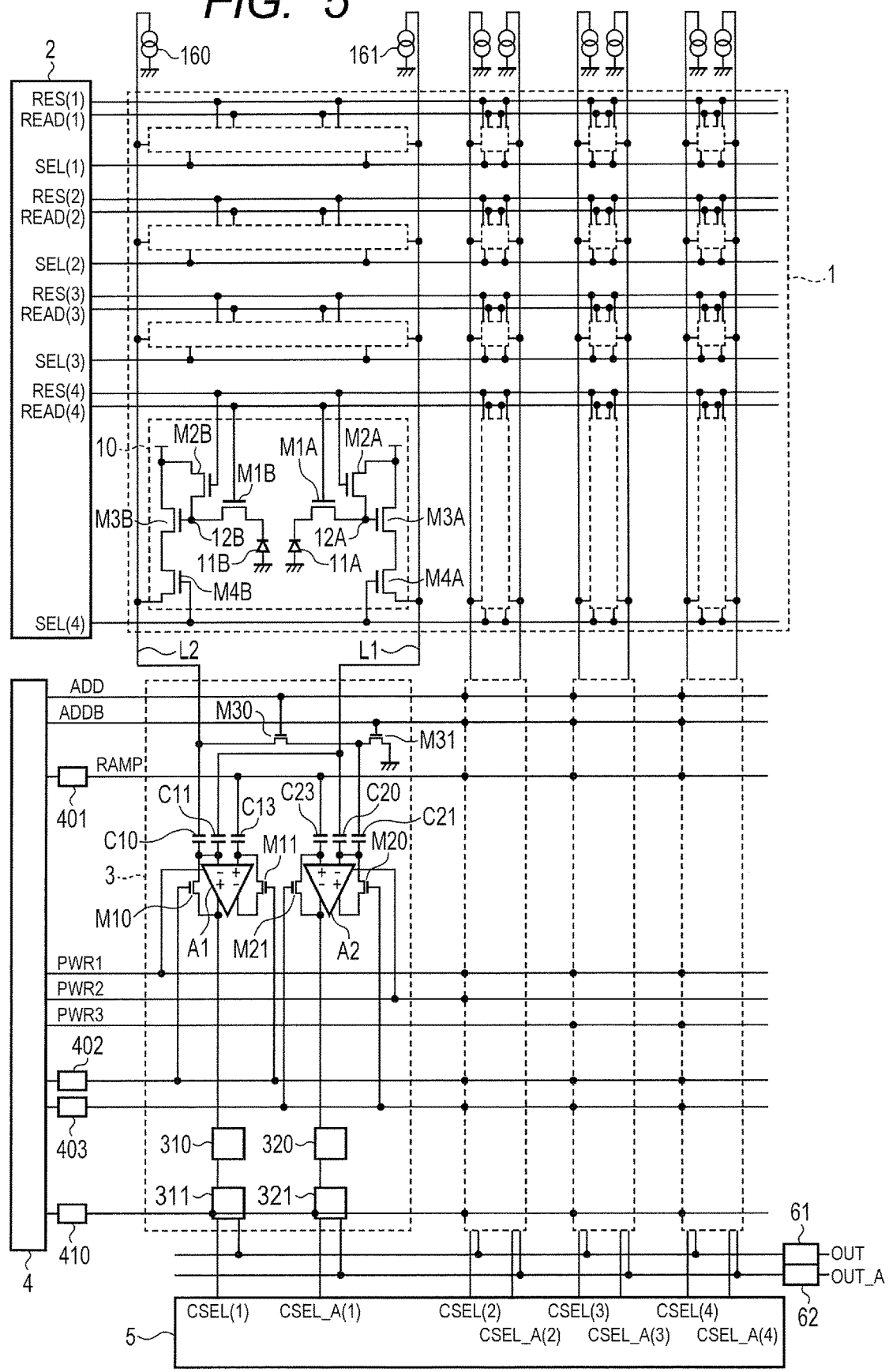
FIG. 5 is a block diagram of an imaging device of a third embodiment.

FIG. 5 is a block diagram of an imaging device of the present embodiment. The present embodiment will be described below mainly for the features different from the second embodiment. In FIG. 5, the member having the same function as that in the second embodiment is labeled with the same reference symbol.

The column circuit 3 of the present embodiment further has transistor switches M30 and M31 and an input capacitor C21. The transistor switch M30 and the input capacitor C21 are connected in series between the column signal line L2 and the non-inverting input terminal of the comparator A2. The transistor switch M31 is connected between the connection node of the transistor switch M30 and the input capacitor C21 and the ground line. A control signal ADD is applied to the gate of the transistor switch M30, and a control signal ADDB is applied to the gate of the transistor switch M31. The control signals ADD and ADDB are supplied from the control circuit 4.

When the control signal ADD is at a high level and the control signal ADDB is at a low level, the transistor switch M30 is in an on-state and the transistor switch M31 is in an off-state. Thereby, a signal from the column signal line L2 is input to the input capacitor C21. An image signal, which is an addition of a signal from the column signal line L1 and a signal from the column signal line L2, is input to the inverting input terminal of the comparator A2. The comparator A2 can compare the addition signal with the RAMP signal and output a high-level or low-level comparison signal. The pulse generation circuit 320 and the digital memory 321 perform AD conversion of the image signal based on the comparison signal and the counter value. Therefore, a use of the comparison signal of the comparator A2 allows for AD conversion of the image signal that is the addition of the signals of the photoelectric conversion units 11A and 11B. That is, an image signal based on the comparison result of the comparator A1 and an image signal based on the comparison result of the comparator A2 can be obtained at the same time. For example, it is possible to reduce a noise of an image signal by performing an averaging process on two image signals by using the signal processing circuits 61 and 62.

When the control signal ADD is at a low level and the control signal ADDB is at a high level, the transistor switch M30 is in an off-state and the transistor switch M31 is in an on-state. Thereby, the column signal line L2 and the input capacitor C21 are electrically disconnected, and only the signal from the column signal line L1 is input to the inverting input terminal of the comparator A2. Note that, in response to the transistor switch M31 being turned on, the ground potential is applied to the input side electrode of the input capacitor C21. This can prevent a noise from entering the input side electrode of the input capacitor C21.

According to the present embodiment, a mode for readout of two image signals from one pixel 10 can be switched to and from a mode for readout of an image signal and a focus detection signal from one pixel 10. It is therefore possible to change the readout mode as appropriate in accordance with usage of the imaging device. Further, the optimal readout of the image signal and the focus detection signal can be performed without using a digital adder, and thus the circuit size can be reduced.

Fourth Embodiment

Figure 6:
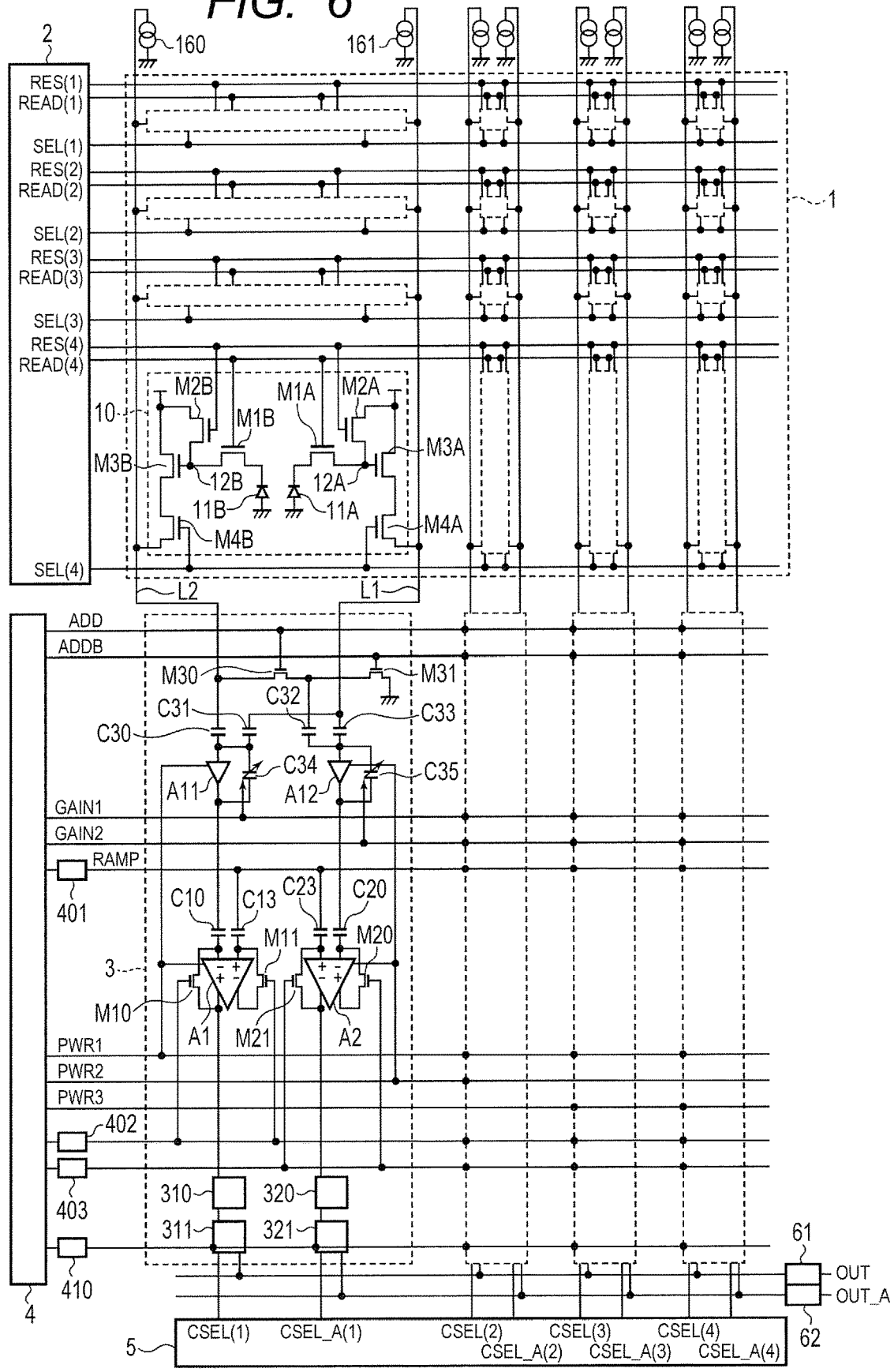
FIG. 6 is a block diagram of an imaging device of a fourth embodiment.

FIG. 6 is a block diagram of an imaging device of the present embodiment. The present embodiment will be described below mainly for the features different from the third embodiment. In FIG. 6, the element having the same function as that in the third embodiment is labeled with the same reference symbol.

The column circuit 3 of the present embodiment further has inverting amplifier circuits A11 and A12 and variable capacitors C34 and C35. The inverting amplifier circuits A11 and A12 are provided on the pre-stage of the comparators A1 and A2, respectively. The input terminal of the inverting amplifier circuit A11 is connected to the column signal lines L1 and L2 via the input capacitors C30 and C31, respectively. The output terminal of the inverting amplifier circuit A11 is connected to the inverting input terminal of the comparator A1 via the input capacitor C10. The input terminal of the inverting amplifier circuit A12 is connected to the column signal line L1 via the input capacitor C33 and connected to the column signal line L2 via the transistor switch M30 and the input capacitor C32. The output terminal of the inverting amplifier circuit A12 is connected to the inverting input terminal of the comparator A2 via the input capacitor C20. The variable capacitors C34 and C35 form feedback circuits of the inverting amplifier circuits A11 and A12, respectively. The capacitances of the variable capacitor C34 and C35 can be changed by the control signals GAIN1 and GAIN2. Thus, the gains of the inverting amplifier circuits A11 and A12 can be changed independently.

In the present embodiment, when two image signals are read out from one pixel 10, the gains of respective image signals can be differentiated. For example, it is possible to perform readout with a wide dynamic range by combining a low-gain image signal suitable for a high brightness image and a high-gain image signal suitable for a low brightness image.

Further, the inverting amplifier circuit A11 can be controlled by the control signal PWR1 common to the comparator A1, and the inverting amplifier circuit A12 can be controlled by the control signal PWR2 or the control signal PWR3 each common to the comparator A2. It is therefore possible to independently control the operation state of the comparator A1 and the inverting amplifier circuit A11 that are used for the image signal and the operation state of the comparator A2 and the inverting amplifier circuit A12 that are used for the focus detection signal. For example, when only the image signal is read out, the consumption current can be reduced by causing the comparator A2 to be in a non-operating state. Therefore, also in the present embodiment, it is possible to separately control the readout circuits for the case of reading out an image signal and the case of reading out an image signal and a focus detection signal, respectively.

Fifth Embodiment

Figure 7:
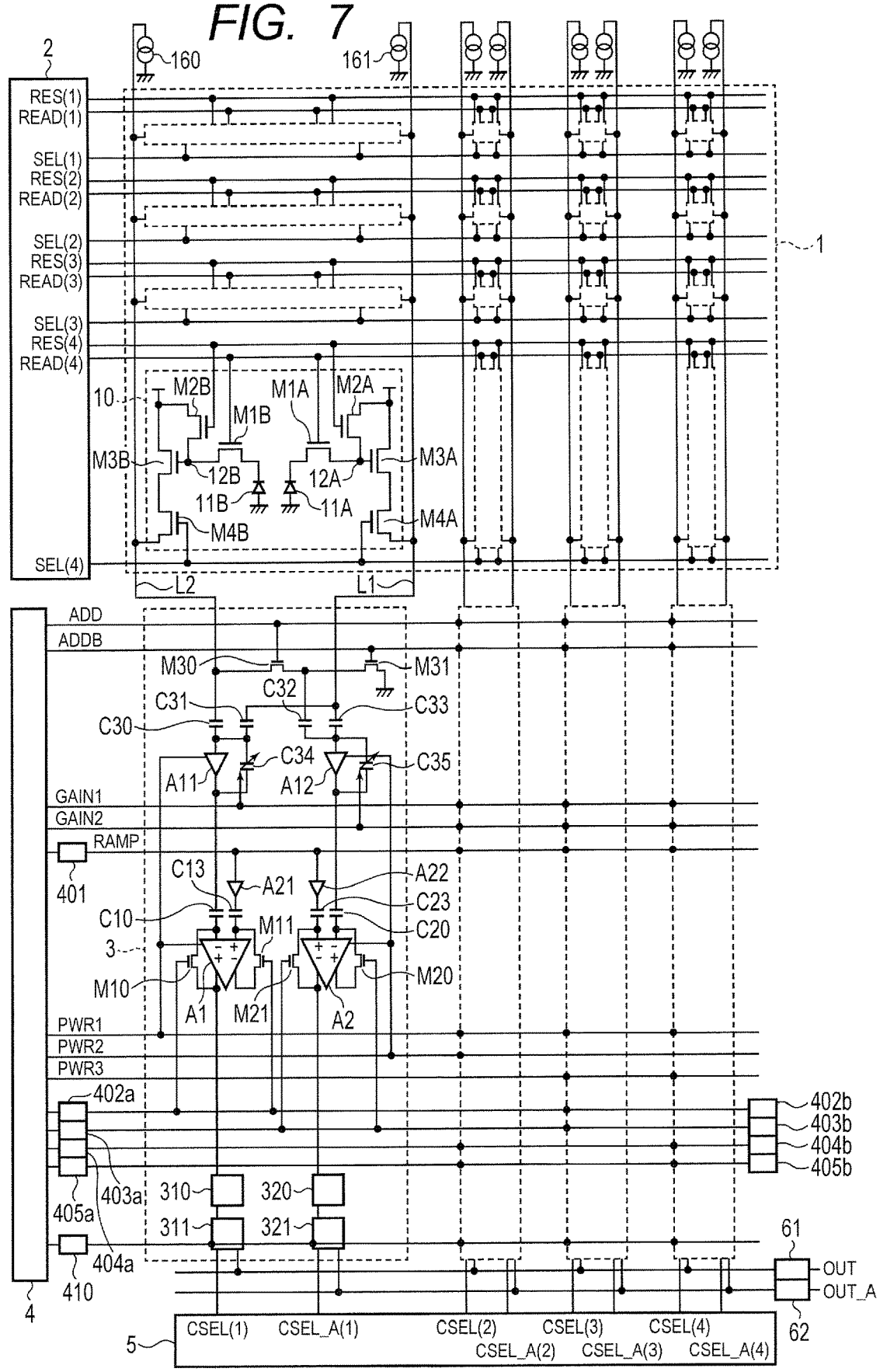
FIG. 7 is a block diagram of an imaging device of a fifth embodiment.

FIG. 7 is a block diagram of an imaging device of the present embodiment. The present embodiment will be described below mainly for the features different from the fourth embodiment. In FIG. 7, the member having the same function as that in the fourth embodiment is labeled with the same reference symbol.

The column circuit 3 further has source followers (voltage followers) A21 and A22. The source followers A21 and A22 function as buffer circuits provided between the signal line of the RAMP signal generation circuit 401 and the non-inverting input terminals of the comparators A1 and A2. Further, in the present embodiment, in addition to first reset signal generation circuits 402a to 405a, second reset signal generation circuits 402b to 405b are provided. The first reset signal generation circuits 402a to 405a and the second reset signal generation circuits 402b to 405b are connected to both ends of the signal lines, respectively. That is, the first reset signal generation circuits 402a to 405a and the second reset signal generation circuits 402b to 405b are arranged so as to interpose the plurality of column circuits 3. Furthermore, in the present embodiment, the number of signal lines of the reset signal is increased, and thereby the number of column circuits 3 connected to one signal line is reduced. According to the above configuration, it is possible to suppress deterioration of the image quality due to noise, a floating capacitance, or the like. The reason therefor will be described below in detail.

The comparator A2 has various operation modes such as AD conversion of the focus detection signal, AD conversion of the image signal, transition of an operating state and a non-operating state, AD conversion of the focus detection signal by using only a part of the column circuits 3, and the like. Further, signals input to the comparators A1 and A2 can be amplified at different gains by the inverting amplifier circuits A11 and A12. In this regard, there may be a problem of a difference in the image quality in switching the operation modes. For example, in an operation mode of AD conversion of the focus detection signal, the comparator A2 used for the focus detection signal inverts the signal earlier than the comparator A1 used for the image signal. At this time, an inversion of the comparison signal of the comparator A2 may cause fluctuation of the potential of the power source line, the GND line, the signal line common to the column circuits 3, or the like. Such potential fluctuation may affect the inversion timing of the comparison signal of the comparator A1, which may appear as a change in the offset or the gain in the AD-converted image signal. In particular, when capturing a dark subject or performing capturing at a low brightness, since the timings of inversion of respective comparison signals of the comparators A1 and A2 are close to each other, an AD conversion operation of the image signal by the comparator A1 is more likely to be affected by the potential fluctuation. Further, when the operation mode is switched, such as when AD conversion of the focus detection signal is switched to be enabled or disabled on a frame basis, a change in the image will be more visible.

Therefore, in order to avoid the above-described problem, it is important to suppress the influence on the comparator A1 due to an inversion operation of the comparator A2 used for the focus detection signal.

The inventors of the present application have found that, when the comparison signal of the comparator A2 is inverted and thereby the power source or the GND fluctuates, potential fluctuation may occur at the input terminal of the comparator A1 due to coupling caused by a parasitic capacitance or the like. Thus, in the present embodiment, the source followers A21 and A22 are provided between the signal line of the RAMP signal generation circuit 401 and the non-inverting input terminals of the comparators A1 and A2. With the source followers A21 and A22 being provided, propagation of potential fluctuation from the non-inverting input terminal of the comparator A2 on each column to the wiring of the RAMP signal is suppressed, and thereby potential fluctuation of the comparator A1 is prevented.

Further, when the comparison signal of the comparator A2 is inverted, potential fluctuation may occur on the control line connected to the gate via the parasitic capacitance between the gate and the drain of the reset switch M21. In the present embodiment, the control lines of the reset switches M10 and M11 of the comparator A1 and the control lines of the reset switches M21 and M22 of the comparator A2 are provided in a separate manner. Thereby, potential fluctuation of the comparator A1 via the control lines can be reduced.

Furthermore, in the present embodiment, in addition to the first reset signal generation circuits 402a to 405a, the second reset signal generation circuits 402b to 405b are provided. That is, potential fluctuation of the control lines can be reduced by driving respective control lines from both the sides. Furthermore, in the present embodiment, the control lines driven by the reset signal generation circuits 405a and 405b are added. Thus, the number of column circuits 3 connected to one signal line can be reduced, and thereby potential fluctuation of the control lines can be suppressed. Therefore, potential fluctuation due to the parasitic capacitance between the control lines can be avoided.

The above-described configuration can suppress the influence on the comparator A1 due to the operation of the comparator A2 and avoid deterioration of the image quality. Note that the control lines of the reset switches may be shielded to reduce coupling between the control lines. Further, in accordance with the operation mode of the comparator A2, the offset and the gain of the image signal may be corrected.

Figure 8:
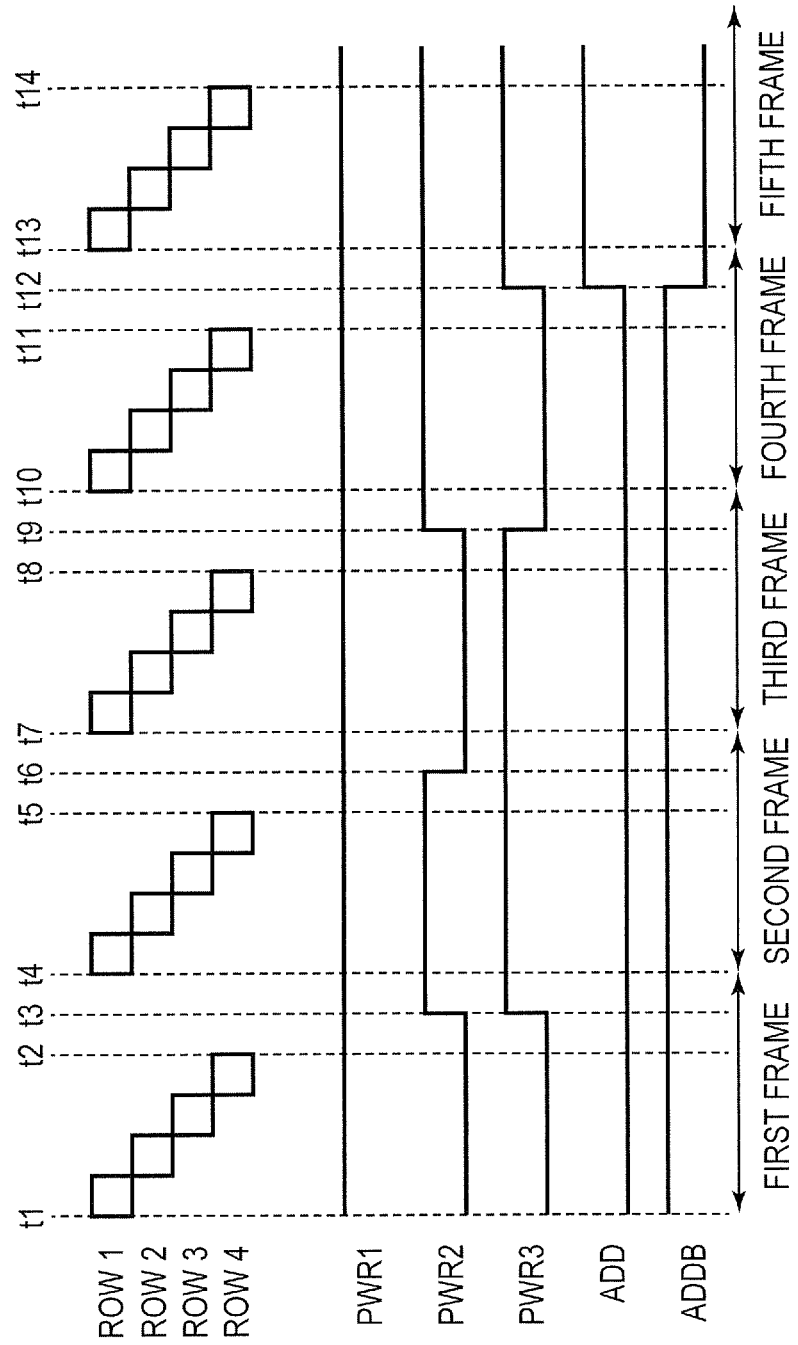
FIG. 8 is a timing chart of an imaging device of the fifth embodiment.

Next, an example of a drive method of the present embodiment will be described. FIG. 8 illustrates a timing chart of the imaging device of the present embodiment. In this example, the readout operation of the pixels 10 of four rows by four columns is illustrated for simplified illustration.

At the time t1, the control circuit 4 outputs a high-level control signal PWR1 and low-level control signals PWR2 and PWR3. In each of all the column circuits 3, the comparator A1 is in an operating state, and the comparator A2 is in a non-operating state. Further, the control circuit 4 outputs a low-level control signal ADD and a high-level control signal ADDB. The transistor switch M30 is in an off-state, and the transistor switch M31 is in an on-state. Thereby, one end of the input capacitor C32 is connected to the GND.

During the time t1 to t2, the vertical scanning circuit 2 sequentially selects the first row to the fourth row, and the column circuit 3 reads out signals on respective rows. The comparator A1 of the column circuit 3 outputs a comparison signal of the addition signal of the photoelectric conversion units 11A and 11B with the RAMP signal, and the digital memory 311 holds, as an image signal, a count value obtained when the comparison signal is inverted. The horizontal scanning circuit 5 scans the column circuits 3 and sequentially outputs image signals from the digital memories 311. After the completion of readout of all the rows in the first frame at the time t2, the control signals PWR2 and PWR3 change from a low level to a high level at the time t3, and the comparator A2 on each column enters an operating state.

At the time t4, readout in the second frame is started. At this time, since the comparator A2 of each of the column circuits 3 is in an operating state, the column circuit 3 reads out a focus detection signal in addition to an image signal. Note that the control circuit 4 changes the control signals PWR2 and PWR3 from a low level to a high level at the time t3 before starting readout, which allows the operation of the comparator A2 to be stabilized at the time t4 when starting readout. At the time t5, readout of all the rows in the second frame is completed.

At the time t6, the control circuit 4 changes the control signal PWR2 from a high level to a low level, and thereby the comparators A2 on the first column and the second column enter a non-operating state. The comparators A2 on the third column and the fourth column are maintained in an operating state, and focus detection signals from the right side region in the pixel unit 1 are ready to be read out. During the time t7 to t8, readout of each row in the third frame is performed. That is, image signals from the entire pixel unit 1 and focus detection signals from the right side region in the pixel unit 1 are read out. At the time t8, readout of all the rows in the third frame is completed.

At the time t9, the control circuit 4 inverts the level of the control signals PWR2 and PWR3. That is, the comparator A2 on the first column and the second column enter an operating state, and the comparator A2 on the third column and the fourth column enter a non-operating state. Thereby, focus detection signals from the left side region in the pixel unit 1 are ready to be read out. During the time t10 to t11, readout of each row in the fourth frame is performed. Here, image signals from the entire pixel unit 1 and focus detection signals from the left side region in the pixel unit 1 are read out. Readout in the third frame and the fourth frame allows for obtaining image signals from all the pixels 10 for two frames, focus detection signals from the right side region in the pixel unit 1, and focus detection signals from the left side region. With the above operation, it is possible to reduce power consumption while obtaining image signals of all the pixels and focus detection signals of the necessary region. Note that, according to the above-described configuration of the present embodiment, even when the number of comparators A2 in an operating state changes for each frame, the inversion operations of the comparators A1 and A2 do not affect another column circuit 3.

At the time t12, the control circuit 4 controls all the control signals PWR1, PWR2, and PWR3 to a high level to cause the comparators A1 and A2 on each column to be in an operating state. Further, the control circuit 4 inverts the level of the control signals ADD and ADDB to turn on the transistor switch M30 and turn off the transistor switch M31. Thereby, the addition signal of the photoelectric conversion units 11A and 11B is input to both the comparators A1 and A2, and each column circuit 3 is transitioned to a mode for performing AD conversion on two image signals. By adding or combining two image signals, a noise reduction and a wide dynamic range can be realized.

Sixth Embodiment

Figure 9:
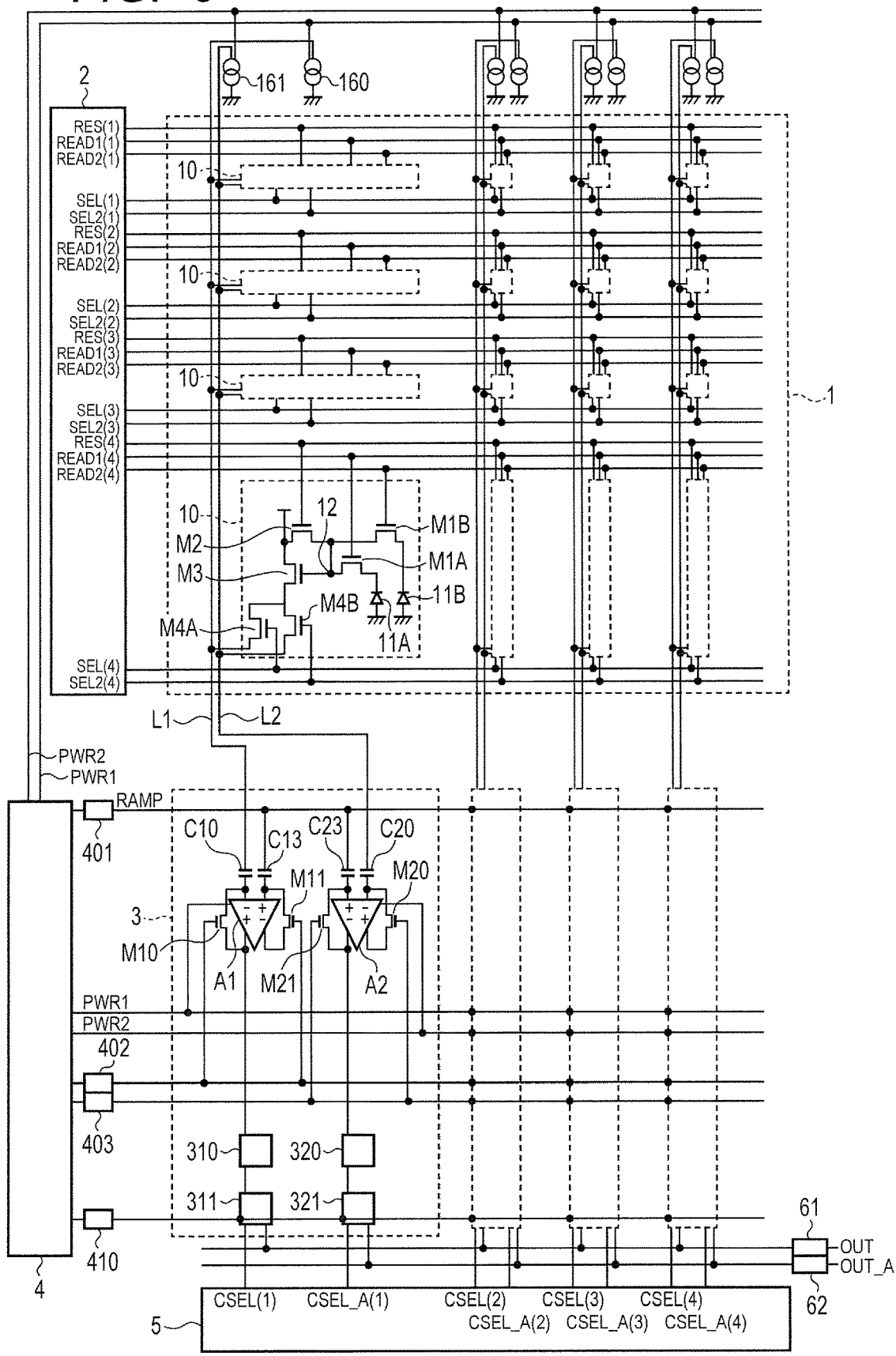
FIG. 9 is a block diagram of an imaging device of a sixth embodiment.

FIG. 9 is a block diagram of an imaging device of the present embodiment. In the present embodiment, the photoelectric conversion units 11A and 11B of the pixel 10 share a floating diffusion region 12, a reset transistor M2, and an amplification transistor M3. The present embodiment will be described below mainly for the features different from the first embodiment.

Each of the pixels 10 includes the pair of photoelectric conversion units 11A and 11B, the first and second transfer transistors M1A and M1B, the floating diffusion region 12, the reset transistor M2, the amplification transistor M3, and the first and second selection transistors M4A and M4B. Charges of the photoelectric conversion units 11A and 11B can be added in the common floating diffusion region 12. The first selection transistor M4A is connected to the column signal line L1, and the second selection transistor M4B is connected to the column signal line L2. Further, the current sources 160 and 161 can be controlled separately by the control signals PWR1 and PWR2.

Figure 10:
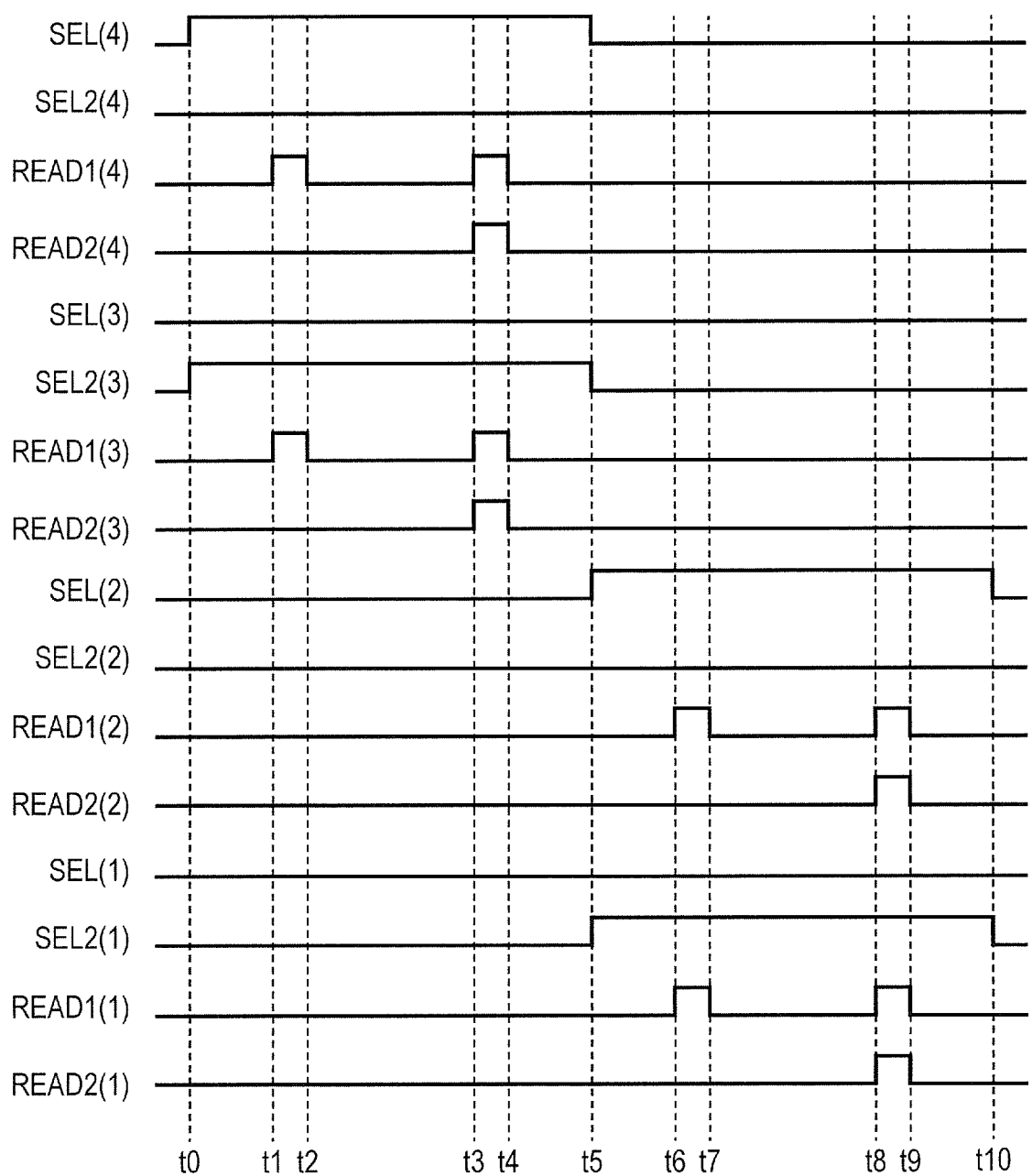
FIG. 10 is a timing chart of an imaging device of the sixth embodiment.

FIG. 10 is a timing chart of the imaging device of the present embodiment, which illustrates a first operation mode for outputting a focus detection signal together with an image signal.

At the time t0, the vertical scanning circuit 2 turns the drive pulses SEL2(3) and SEL(4) to a high level to select two rows at the same time. The pixel 10 on the fourth row is connected to the column signal line L1 via the selection transistor M4A, the pixel 10 on the third row is connected to the column signal line L2 via the selection transistor M4B.

During the time t1 to t2, the vertical scanning circuit 2 outputs high-level drive pulses READ1(3) and READ1(4) to cause the transfer transistor M1A of the pixels 10 on the third row and the fourth row to be in an on-state. Thereby, charges accumulated in the photoelectric conversion unit 11A are transferred to the floating diffusion region 12. The signal of the pixel 10 on the fourth row is output to the column signal line L1, and the signal of the pixel 10 on the third row is output to the column signal line L2. Therefore, the signal of the photoelectric conversion unit 11A on the fourth row is input to the comparator A1, and the signal of the photoelectric conversion unit 11A on the third row is input to the comparator A2. During the time t2 to t3, the focus detection signal of the pixel 10 on the third row and the focus detection signal of the pixel 10 on the fourth row are subjected to AD conversion and held as digital signals in the digital memories 311 and 321, respectively. Respective focus detection signals are output from the signal processing circuits 61 and 62.

During the time t3 to t4, the vertical scanning circuit 2 outputs high-level drive pulses READ1(4), READ2(4), READ1(3), and READ2(3). In the pixels 10 on the third row and the fourth row, the transfer transistors M1A and M1B are turned on, and respective charges of the photoelectric conversion units 11A and 11B are added in the floating diffusion region 12. The signal of the pixel 10 on the fourth row is output to the column signal line L1, and the signal of the pixel 10 on the third row is output to the column signal line L2. After the potentials of the column signal lines L1 and L2 are stabilized and the output of the focus detection signal is completed, the column circuit 3 starts AD conversion of the image signal. That is, the comparator A1 performs AD conversion on the image signal of the pixel 10 on the fourth row, and the comparator A2 performs AD conversion on the image signal of the pixel 10 on the third row.

The image signals after the AD conversion is performed thereon are held in the digital memories 311 and 321 and output via the signal processing circuits 61 and 62, respectively. With the above-described operation, the focus detection signal and the image signal of the pixels 10 for two rows can be obtained. In a period of the time t5 to t10, the same operation as that in the period of the time t0 to t5 is performed, and thereby the focus detection signal and the image signal of the pixels 10 for two rows, namely, the first row and the second row can be obtained.

Figure 11:
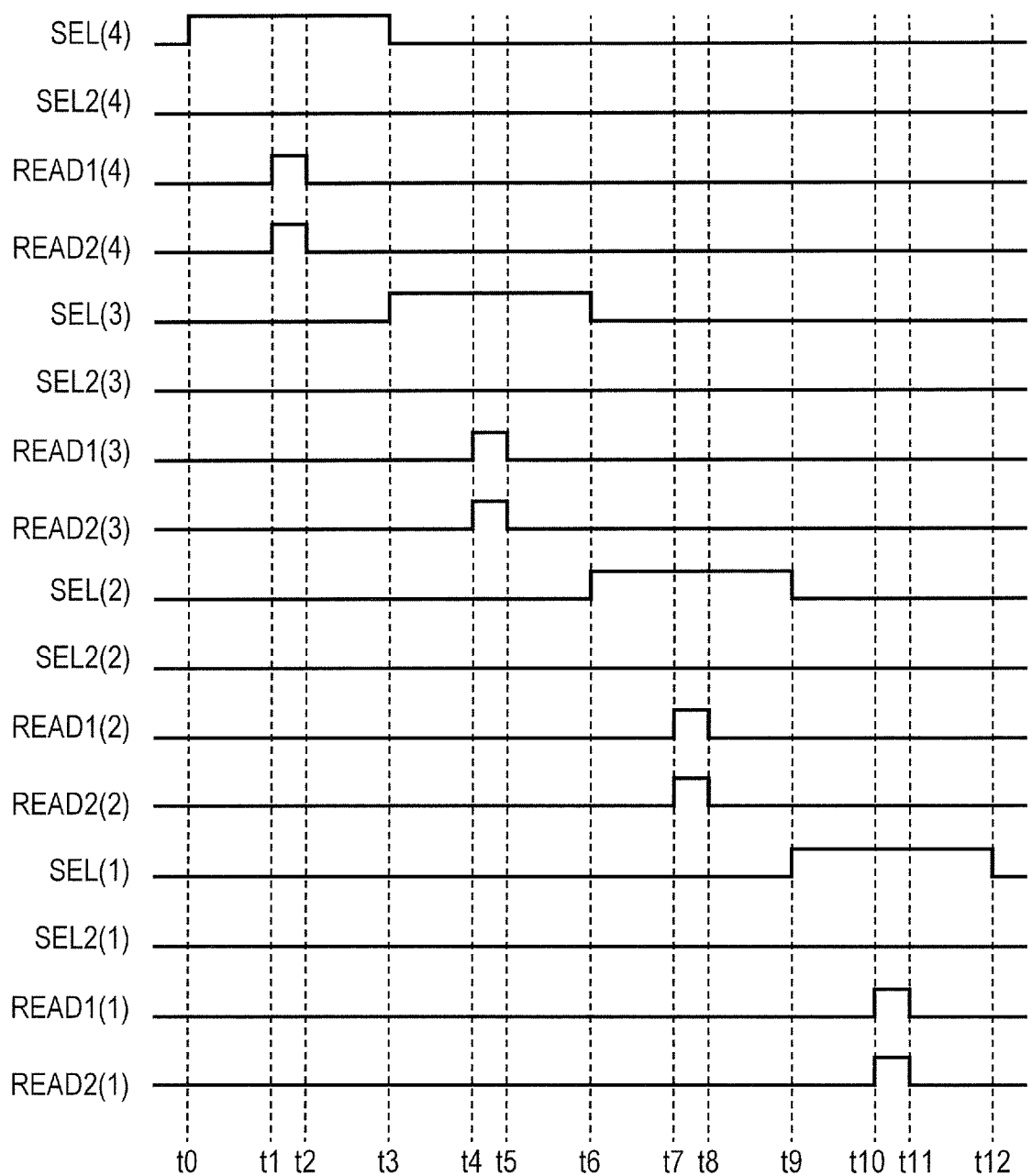
FIG. 11 is a timing chart of the imaging device of the sixth embodiment.

FIG. 11 is a timing chart of the imaging device of the present embodiment, which illustrates a second operation mode for outputting only the image signal. The difference from FIG. 10 is in that the drive pulses SEL2(1) to SEL2(4) are at a low level all the time and thus the selection transistor M4B and the column signal line L2 are not used. That is, simultaneous readout for two rows is not performed, and sequential readout on a row basis is performed.

At the time t0, the vertical scanning circuit 2 turns the drive pulse SEL(4) to a high level to cause the selection transistor M4A of the pixel 10 on the fourth row to be in an on-state. Thereby, the amplification transistor M3 is connected to the column signal line L1 via the selection transistor M4A.

During the time t1 to t2, the vertical scanning circuit 2 outputs high-level drive pulses READ1(4) and READ2(4). The transfer transistors M1A and M1B of the pixel 10 on the fourth row are turned on, and charges accumulated in the photoelectric conversion units 11A and 11B are transferred to the floating diffusion regions 12 and added. Since no focus detection signal is required to be read here, unlike FIG. 10, the time required for readout can be reduced by simultaneously turning on the transfer transistors M1A and M1B. The image signal of the pixel 10 on the fourth row is output to the column signal line L1 and subjected to AD conversion at the comparator A1. The image signal after the AD conversion is performed thereon is held in the digital memory 311 and output via the signal processing circuits 61 and 62.

During the time t3 to t6, the drive pulse SEL(3) is at a high level, and the pixel 10 on the third row is selected. During the time t4 to t5, the drive pulses READ1(3) and READ2(3) are at a high level, and the image signal of the pixel 10 on the third row is read out. In a similar manner, the image signal of the pixel 10 on the second row is read out during the time t6 to t9, and the image signal of the pixel 10 on the first row is read out during the time t9 to t12. With the above operation, the image signals of all the pixels 10 are obtained. Note that, in the second operation mode of FIG. 11, it is possible to reduce power consumption by outputting a low-level control signal PWR2 to cause the comparator A2 and the current source 161 to be in a non-operating state.

As discussed above, when only the image signal is read out in the reduced time, the pixel signals on all the rows can be output from the column signal line L1. Further, power consumption can be reduced in accordance with the operation mode. Further, also in the present embodiment, the operation mode for reading out only the image signal can be switched to and from the operation mode for reading out the image signal and the focus detection signal with a reduced circuit size.

Seventh Embodiment

Figure 12:
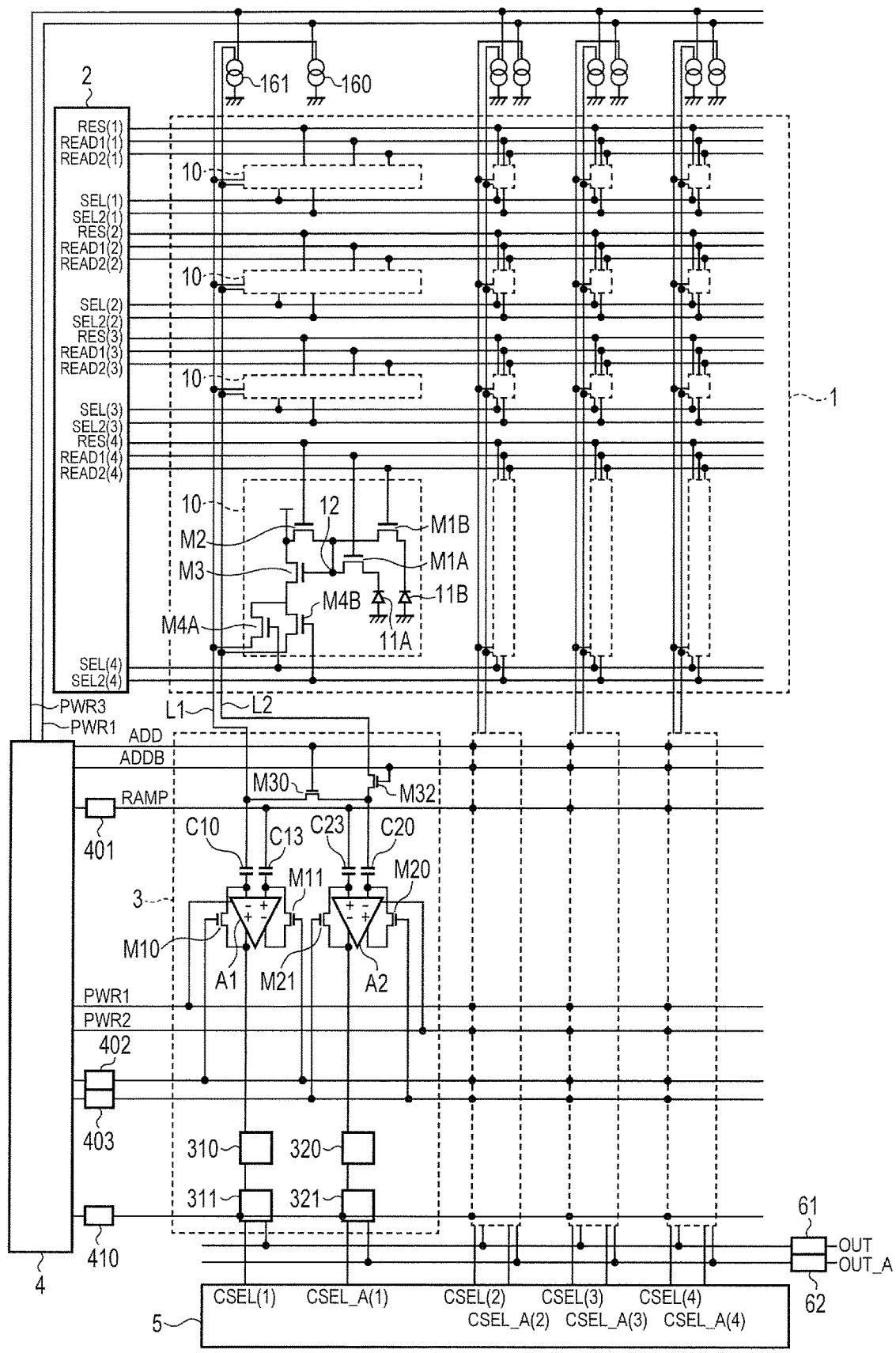
FIG. 12 is a block diagram of an imaging device of a seventh embodiment.

FIG. 12 is a block diagram of an imaging device of the present embodiment. The present embodiment will be described below mainly for the features different from the sixth embodiment. In FIG. 12, the element having the same function as that in the sixth embodiment is labeled with the same reference symbol.

In the present embodiment, the operation states of the current sources 160 and 161 can be controlled in a separate manner by the control signals PWR1 and PWR3, respectively. In the second operation mode for reading out only the image signal, a low-level control signal PWR3 can be output to cause the power source 161 to be in a non-operating state.

Further, the column circuit 3 further has transistor switches M30 and M32. The transistor switch M30 is connected between the column signal line L1 and the inverting input terminal of the comparator A2. The transistor switch M32 is connected between the column signal line L2 and the inverting input terminal of the comparator. The transistor switch M30 is driven by the control signal ADD, and the transistor switch M32 is driven by the control signal ADDB. When the transistor switch M30 is in an off-state and the transistor switch M32 is in an on-state, the same operation mode as in the sixth embodiment can be realized. That is, the first operation mode for reading out the image signal and the focus detection signal on a two-row basis and the second operation mode for reading out only the image signal on a row basis can be switched and performed. In the second operation mode in which only the image signal is read out, the comparator A2 is controlled to be in a non-operating state.

When the transistor switch M30 is in an on-state and the transistor switch M32 is in an off-state, a signal from the column signal line L1 can be input to the comparators A1 and A2. For example, a noise reduction can be realized by reading out image signals from both the comparators A1 and A2 and averaging the two image signals. Note that, in this operation mode, only the selection transistor M4A is in an on-state, and the signal is read out from the column signal line L1. Therefore, the power consumption can be further reduced by outputting a low-level control signal PWR3 to cause the current source 161 in the column signal line L2 to be in a non-operating state.

Also in the present embodiment, an operation mode for reading out only one image signal, an operation mode for reading out two image signals, and an operation mode for reading out the image signal and the focus detection signal can be switched. Further, by controlling an operating state and a non-operating state of the readout circuit in accordance with the operation mode, the optimum power management can be realized.

Eighth Embodiment

Figure 13:
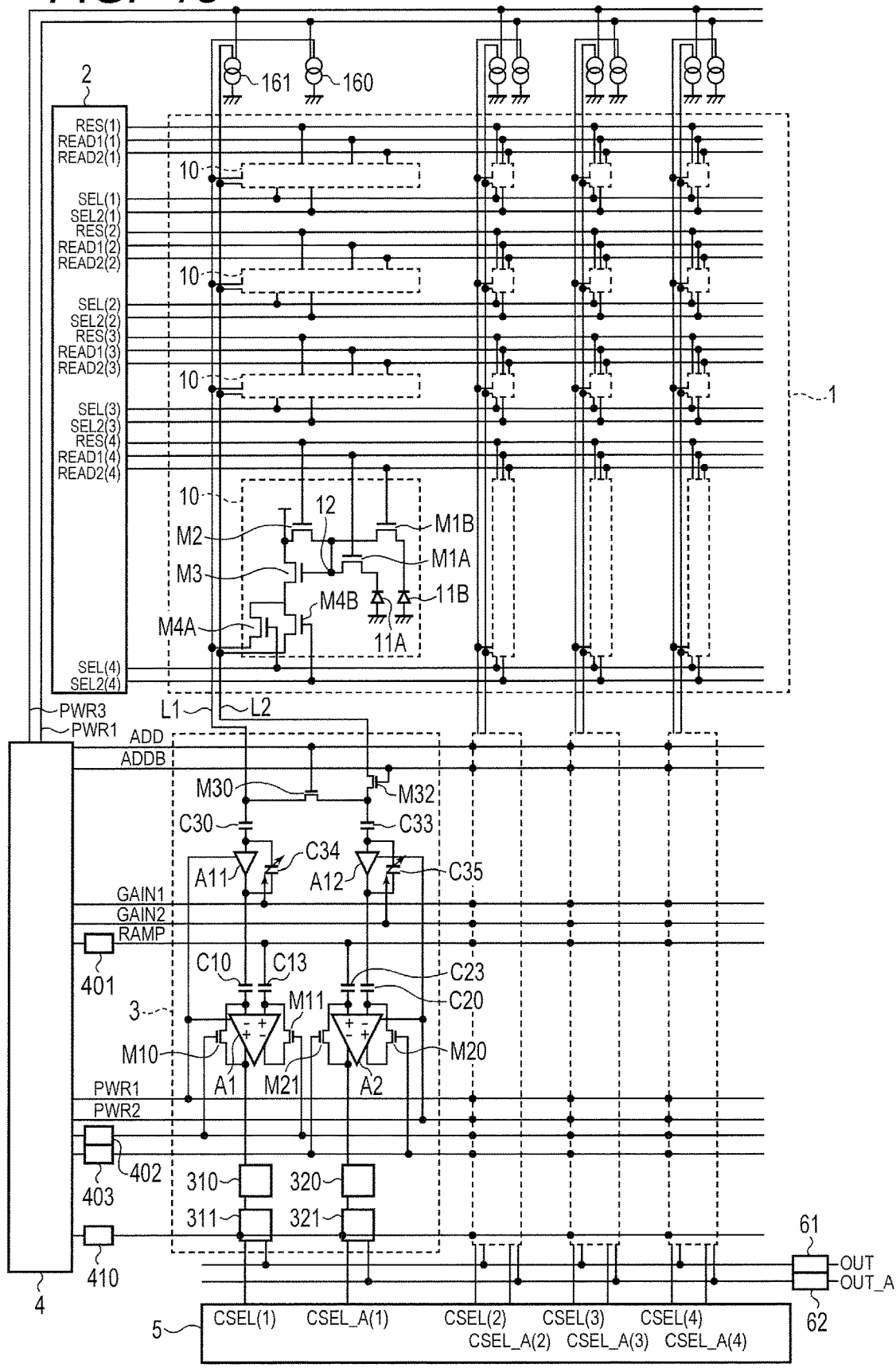
FIG. 13 is a block diagram of an imaging device of an eighth embodiment.

FIG. 13 is a block diagram of an imaging device of the present embodiment. The present embodiment will be described below mainly for the features different from the seventh embodiment. The column circuit 3 in the present embodiment further has inverting amplifier circuits A11 and A12 and variable capacitors C34 and C35. The inverting amplifier circuits A11 and A12 are provided on the pre-stage of the comparators A1 and A2, respectively. The input terminal of the inverting amplifier circuit A11 is connected to the column signal line L1 via the input capacitor C30. The output terminal of the inverting amplifier circuit A11 is connected to the inverting input terminal of the comparator A1 via the input capacitor C10. The input terminal of the inverting amplifier circuit A12 is connected to the column signal line L2 via the input capacitor C33 and connected to the column signal line L1 via the transistor switch M30. The output terminal of the inverting amplifier circuit A12 is connected to the inverting input terminal of the comparator A2 via the input capacitor C20. The variable capacitors C34 and C35 form feedback circuits of the inverting amplifier circuits A11 and A12, respectively. The capacitances of the variable capacitor C34 and C35 can be changed by the voltages of the control signals GAIN1 and GAIN2. Thus, the gains of the inverting amplifier circuits A11 and A12 can be changed independently.

In the present embodiment, when two image signals are read out from one pixel 10, the gains of respective image signals can be differentiated. For example, it is possible to perform readout with a wide dynamic range by combining a low-gain image signal suitable for a high brightness image and a high-gain image signal suitable for a low brightness image. Further, the power consumption can be further reduced by outputting a low-level control signal PWR3 to cause the current source 161 to be in a non-operating state.

Ninth Embodiment

Figure 14:
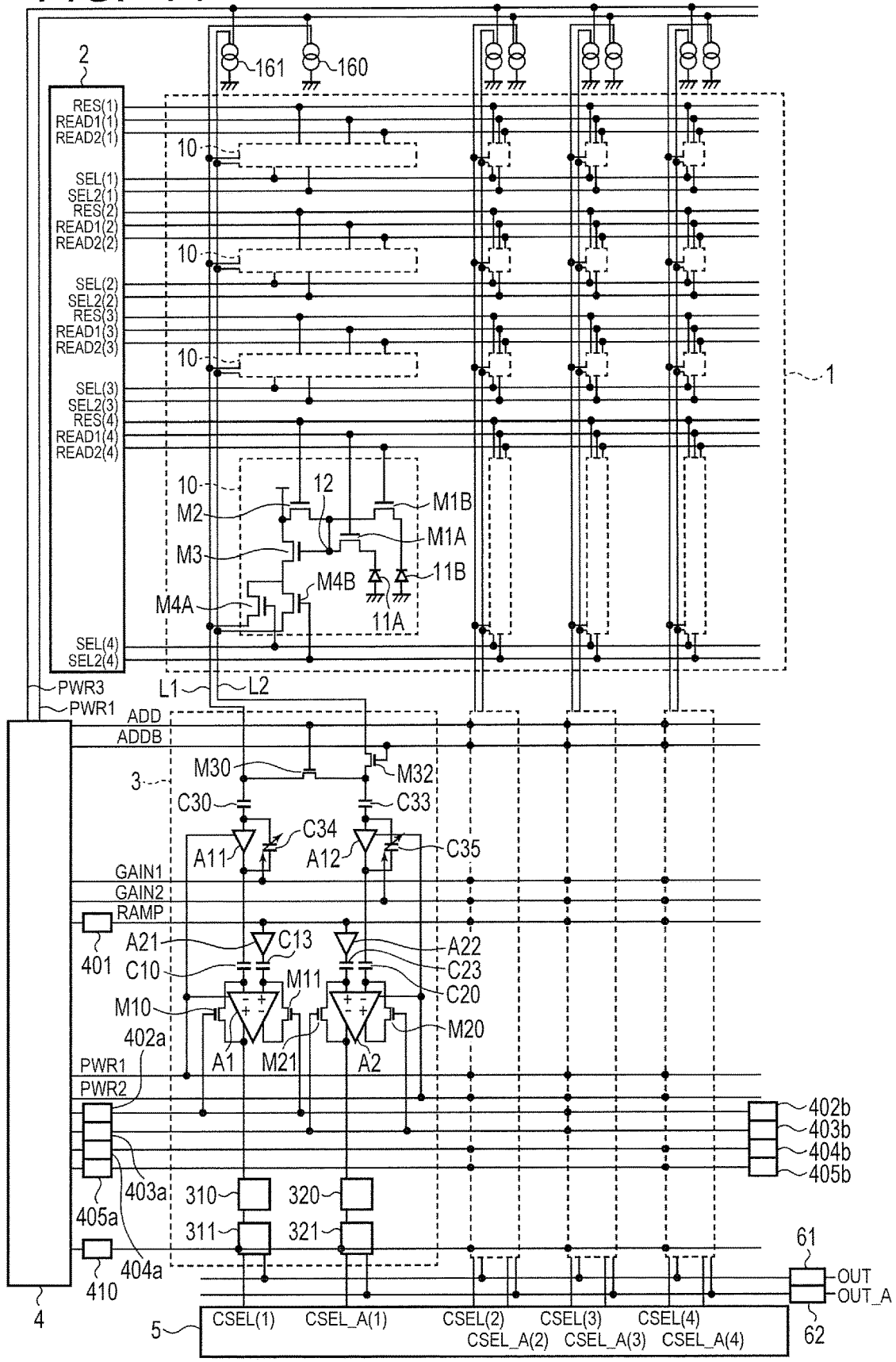
FIG. 14 is a block diagram of an imaging device of a ninth embodiment.

FIG. 14 is a block diagram of an imaging device of the present embodiment. The present embodiment will be described below mainly for the features different from the fifth embodiment or the eight embodiment.

The column circuit 3 of the present embodiment further has the source followers A21 and A22 in a similar manner to the fifth embodiment. The source followers A21 and A22 are provided between the signal line of the RAMP signal generation circuit 401 and the non-inverting input terminals of the comparators A1 and A2, respectively. This can suppress propagation of potential fluctuation from the non-inverting input terminal of the comparator A2 on each column to the comparator A1 via the wiring of the RAMP signal. Further, in the present embodiment, the signal lines of the reset transistors are driven by the first reset signal generation circuits 402a to 405a and the second reset signal generation circuits 402b to 405b connected to the both sides of the signal lines. Furthermore, in the present embodiment, the number of signal lines of the reset signals is increased to reduce the number of column circuits 3 connected to one signal line, and thereby potential fluctuation on the signal lines can be suppressed.

Figure 15:
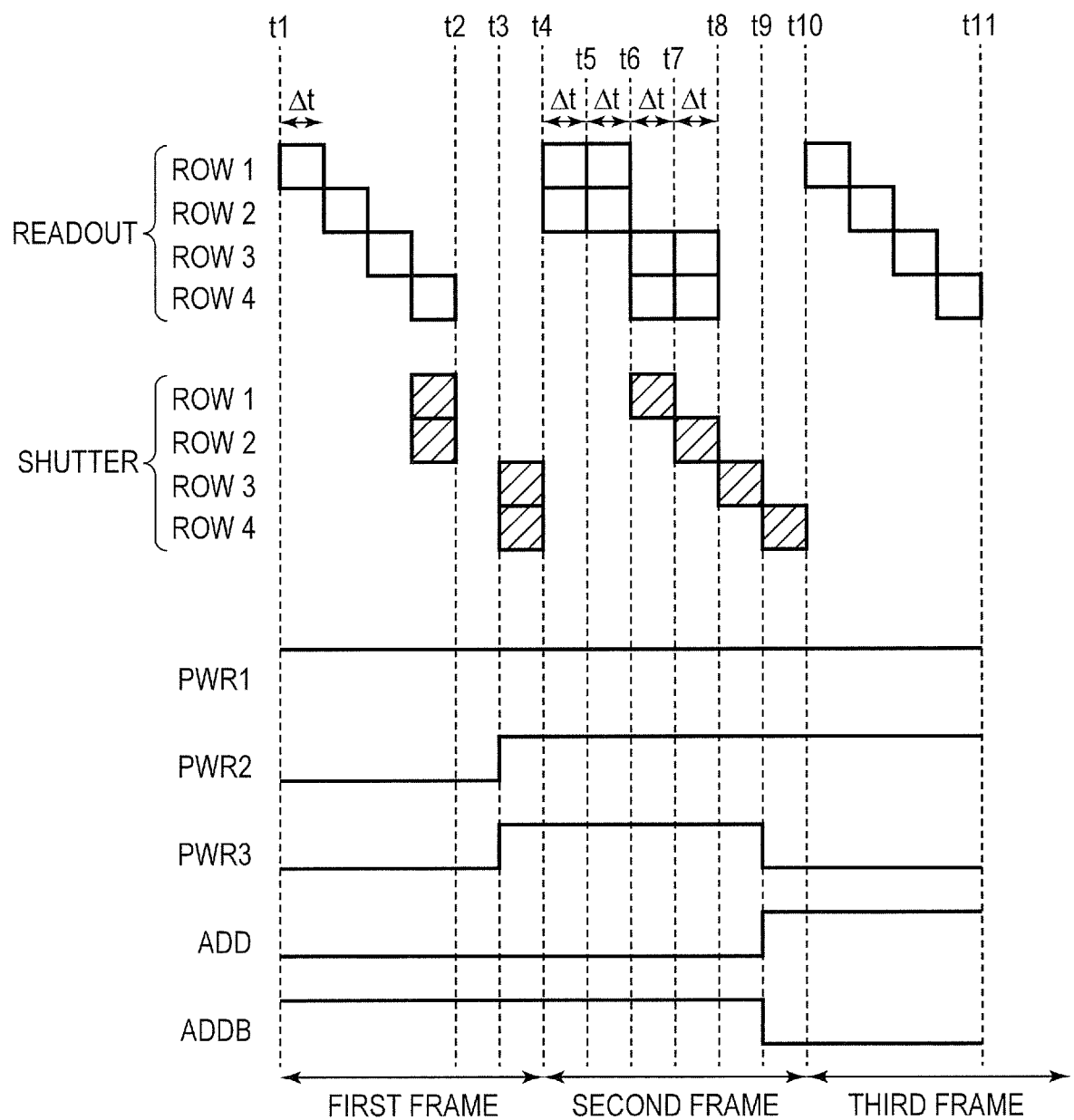
FIG. 15 is a timing chart of an imaging device of the ninth embodiment.

FIG. 15 is a timing chart of the imaging device of the present embodiment, which illustrates an example in which the operation mode is switched on a frame basis. In this example, the readout operation of the pixels 10 of four rows by four columns is illustrated for simplified illustration.

At the time t1, the control circuit 4 outputs a high-level control signal PWR1 and low-level control signals PWR2 and PWR3. In all the column circuits 3, the comparator A1 and the current source 160 are in an operating state, and the comparator A2 and the current source 161 are in a non-operating state. Further, the control circuit 4 outputs a low-level control signal ADD and a high-level control signal ADDB. Thereby, the signal from the column signal line L1 is input to only the comparator A1 but not input to the comparator A2. Therefore, the signal from the column signal line L1 is input to the comparator A1 via the inverting amplifier circuit A11, and AD conversion of the image signal only is performed.

During the time t1 to t2, the vertical scanning circuit 2 sequentially scans the first row to the fourth row, and the comparator A1 performs the second operation mode for reading out the image signal on a row basis (see FIG. 11). That is, in the pixel 10, the transfer transistors M1A and M1B are turned on at the same time, and the charges of the photoelectric conversion units 11A and 11B are added in the floating diffusion region 12. The image signal based on the added charges is output to the column signal line L1 and subjected to AD conversion at the comparator A1. Here, when the time required for readout of one row is denoted as Δt, the time required for readout of the first frame is 4×Δt. At the time t2, after the completion of the readout of all the rows, the control signals PWR2 and PWR3 are switched to a high level at the time t3, the comparator A2 and the current source 161 on each column enter an operating state. Thereby, the column circuit 3 enters the first operation mode for reading out in a two-row basis (see FIG. 10).

At the time t4, readout of the second frame is started. First, the vertical scanning circuit 2 turns on the selection transistor M4A on the first row and turn on the selection transistor M4B on the second row. Subsequently, the transfer transistors M1A on the first row and the second row are turned on, respectively. A signal based on charges of the photoelectric conversion unit 11A on the first row is output to the column signal line L1, and a signal based on charges of the photoelectric conversion unit 11A on the second row is output to the column signal line L2. Thereby, AD conversion of the signal on the first row is performed by the comparator A1, and AD conversion of the signal on the second row is performed by the comparator A2. The digital signals after the AD conversion are output as focus detection signals, respectively, and readout of the focus detection signals of the first row and the second row are completed at the time t5. The time required for readout of the focus detection signals on the first row and the second row is Δt.

At the time t5, the selection transistors M4A and M4B on the first row and the second row are both turned on, and the charges of the photoelectric conversion units 11A and 11B are added in the floating diffusion region 12 and read out as the image signal. The comparator A1 performs AD conversion of the image signal on the first row, and the comparator A2 performs AD conversion of the image signal on the second row. The time required for readout of the image signals on the first row and the second row is Δt.

During the time t6 to t7, readout of the focus detection signals on the third row and the fourth row is performed. During the time t7 to t8, readout of the image signals on the third row and the fourth row is performed. The required time for each readout is Δt in the same manner. Therefore, the time required for readout of the second frame is 4×Δt, which is the same as the time required for readout of the first frame. In the second frame, since the focus detection signal is read out in addition to the image signal, the time required for readout of each row is twice the time required for readout of the focus detection signal. However, since two rows are read out at the same time in the second frame, each time required for readout of each frame can be the same.

At the time t9, the control signal PWR3 changes from a high level to a low level causing the current source 161 to be again in a non-operating state, and thus no signal is output from the pixel 10 to the column signal line L2. Further, the levels of the control signals ADD and ADDB are inverted, the image signal from the column signal line L1 is ready for AD conversion in both of the comparators A1 and A2.

During the time t10 to t11, the vertical scanning circuit 2 sequentially scans the first row to the fourth row, and the comparators A1 and A2 perform AD conversion of the image signals on a row basis. The time required for readout of the third frame is 4×Δt, which is the same as the time required for readout of each of the first frame and the second frame.

Next, the shutter operation of the present embodiment will be described. In FIG. 15, prior to readout of the image signals of the first row and the second row during the time t5 to t6, shutter operations of the first row and the second row are performed immediately before the time t2. That is, immediately before the time t2, the transfer transistors M1A and M1B and the reset transistor M2 are turned on, and charges in the photoelectric conversion units 11A and 11B are reset. Subsequently, the transfer transistors M1A and M1B are turned off from an on-state, and thereby exposure of the photoelectric conversion units 11A and 11B is started. During the time t5 to t6, the image signals on the first row and the second row are read out, and the exposure is completed. Thereby, the exposure time of the first row and the second row is 4×Δt. Further, prior to readout of the image signals on the third row and the fourth row during the time t7 to t8, shutter operations of the third row and the fourth row are performed during the time t3 to t4. The exposure time of the third row and the fourth row is also 4×Δt, and thus each exposure time of each row for one frame is the same.

Similarly, also in sequential readout of the image signal on a row basis, the same exposure time can be provided. Prior to the sequential readout of the image signal on a row basis during the time t10 to t11, a shutter operation is performed sequentially on a row basis during the time t6 to t10. The exposure time for each row is 4×Δt. In such a way, even when the readout mode performed sequentially on a row basis and the readout mode performed sequentially on a two-row basis are switched on a frame basis, the exposure period can be constant.

Figure 16:
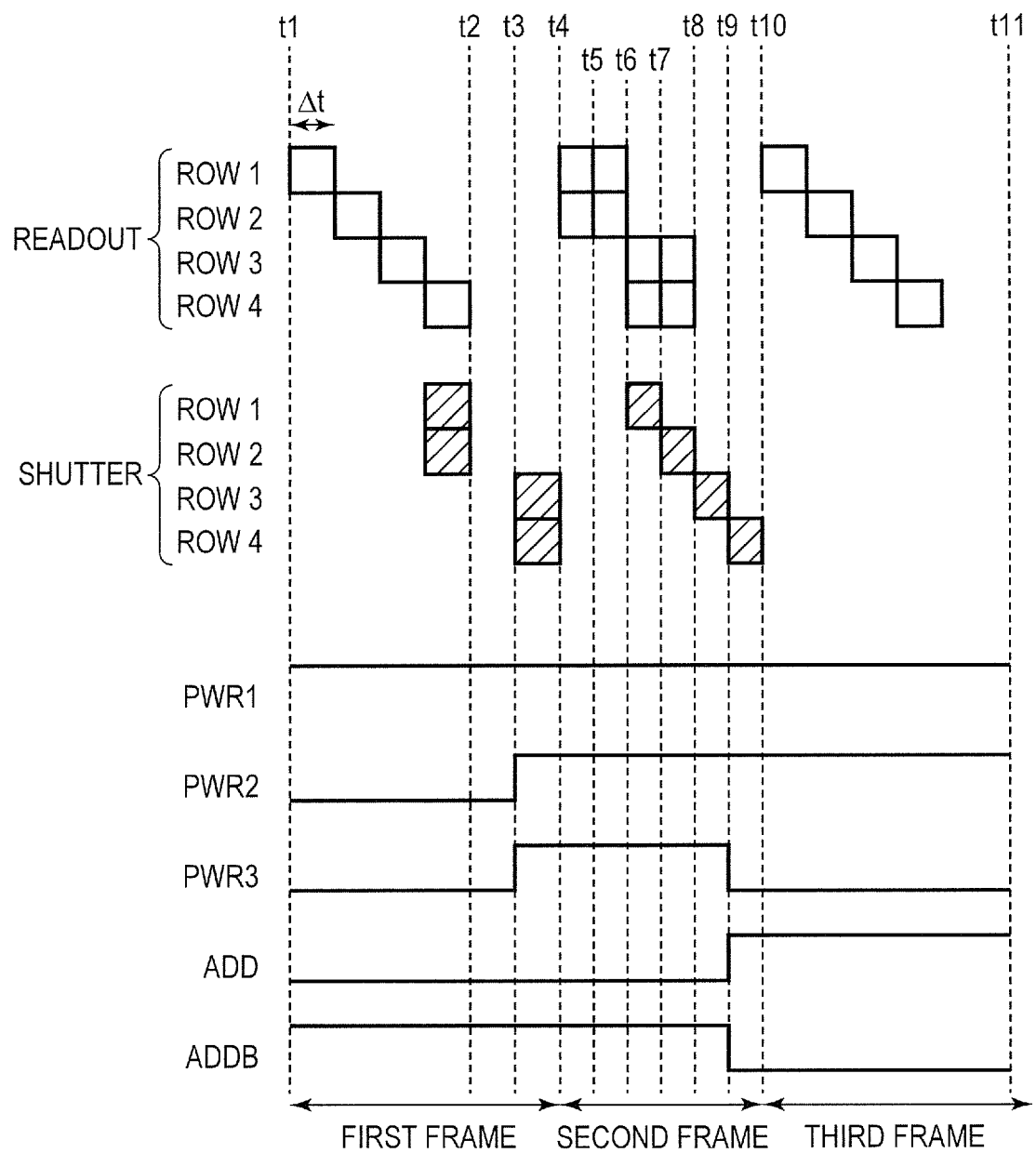
FIG. 16 is a timing chart as a comparative example of an imaging device of the ninth embodiment.

In the present embodiment, a unit time required for sequential readout on a two-row basis is 2×Δt, which is the integral multiple of the unit time Δt required for sequential readout on a row basis. In such a way, with the unit time of sequential readout on a two-row basis being an integral multiple of the unit time required for sequential readout on a row basis, the same exposure time can be provided for each row. A comparative example will now be described. FIG. 16 illustrates a timing chart in which the time of sequential readout on a two-row basis is a non-integral multiple of the time of sequential readout on a row basis. In FIG. 16, a unit time of sequential readout on a two-row basis during the time t4 to t8 is 1.5×Δt. In this case, in the readout during the time t10 to t11, the exposure time increases in the order from the first row to the fourth row, which causes shading in an image of one frame. It is therefore preferable that the unit time of sequential readout on a two-row basis during the time t4 to t8 be an integral multiple of the unit time of sequential readout on a row basis.

Also in the present embodiment, readout of the image signal and the focus detection signal can be controlled in an optimum manner without increasing the circuit size. Further, even when the operation mode is switched, a good image quality can be obtained. Furthermore, constant exposure time can be provided also when a shutter operation is performed, occurrence of shading in an image can be avoided.

Tenth Embodiment

Figure 17:
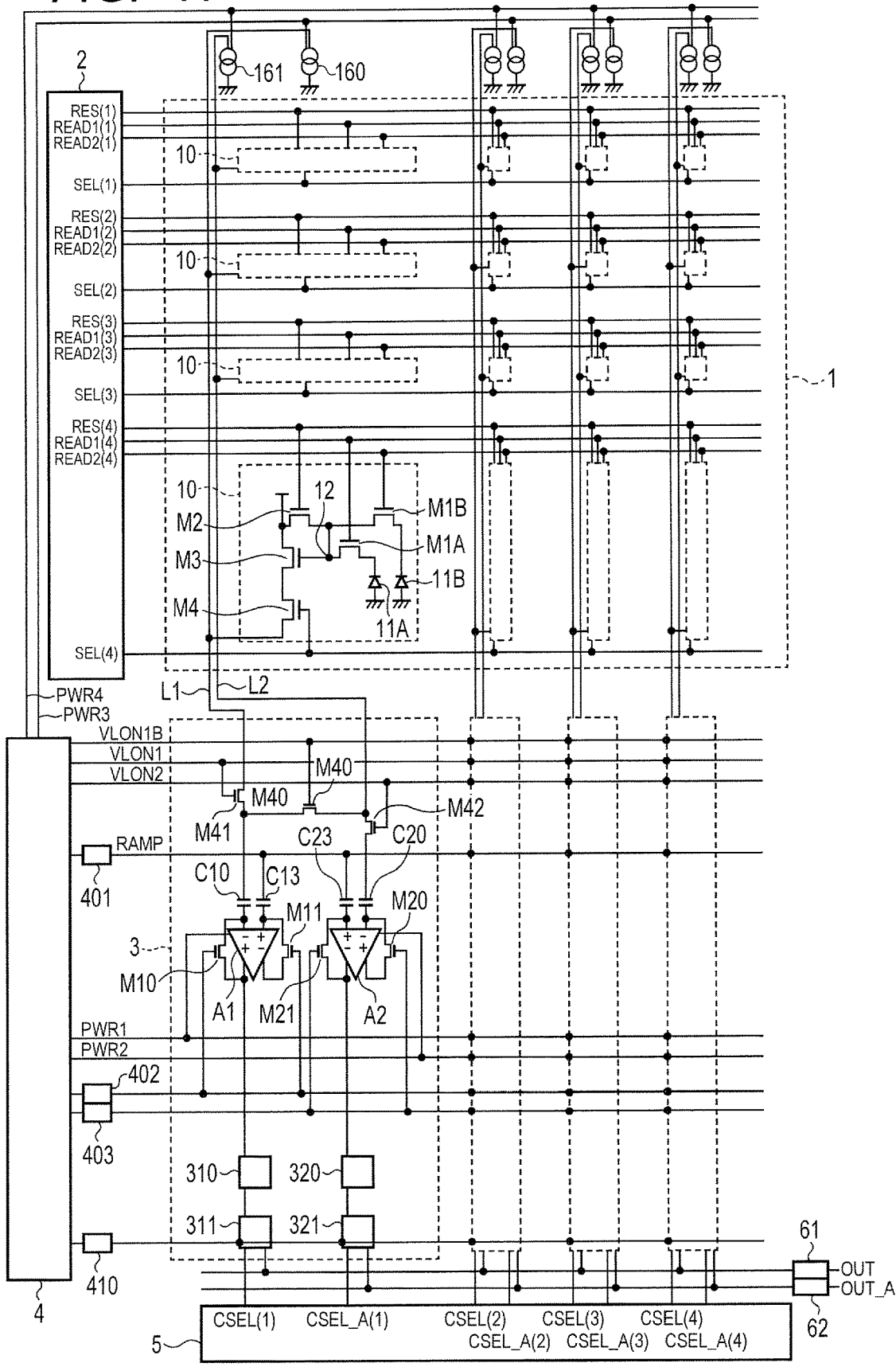
FIG. 17 is a block diagram of an imaging device of a tenth embodiment.

FIG. 17 is a block diagram of an imaging device of the present embodiment. The features different from those of the sixth embodiment will be mainly described below.

The column circuit 3 of the present embodiment has transistor switches M40, M41, and M42. The transistor switch M41 is provided between the column signal line L1 and the inverting input terminal of the comparator A1, and the transistor switch M40 is provided between the column signal lines L1 and L2. The transistor switch M42 is provided between the column signal line L2 and the inverting input terminal of the comparator A2. The transistor switch M40 is driven by a control signal VLON1B, and the transistor switch M41 is driven by a control signal VLON1. Further, the transistor switch M42 is driven by a control signal VLON2. The transistor switches M40, M41, and M42 form a switch circuit that switches the connection between the column signal lines L1 and L2 and the comparators A1 and A2.

The current source 160 is controlled by the control signal PWR3, and the current source 161 is controlled by the control signal PWR4. Therefore, the current sources 160 and 161 can be controlled independently of the comparators A1 and A2. Furthermore, the pixel 10 has the single selection transistor M4, each of the pixels 10 on even-numbered rows are connected to the column signal line L1, and each of the pixels 10 on odd-numbered rows are connected to the column signal line L2.

First, the first operation mode for reading out a focus detection signal together with an image signal will be described. The control circuit 4 causes all the control signals PWR1, PWR2, PWR3, and PWR4 to be at a high level, and thus all the comparators A1 and A2 and the current sources 160 and 161 are in an operating state. Further, the control circuit 4 causes the control signals VLON1 and VLON2 to be at a high level and the control signal VLON1B to be at a low level. Thereby, the transistor switches M41 and M42 enter an on-state, and the transistor switch M40 enters an off-state. The signal from the column signal line L1 is input to the comparator A1, and the signal from the column signal line L2 is input to the comparator A2. As illustrated in FIG. 10 of the sixth embodiment, AD conversion of signals of the pixels 10 for two rows is then performed at the same time by the comparators A1 and A2. That is, the vertical scanning circuit 2 causes the drive pulse SEL(3) and SEL(4) to be at a high level at the same time to turn on the selection transistors M4 of the pixels 10 on the third row and the fourth row. After performing AD conversion of the focus detection signals on the third row and the fourth row, respectively, the comparators A1 and A2 performs AD conversion of the image signals, respectively. Subsequently, the vertical scanning circuit 2 causes the drive pulse SEL(1) and SEL(2) to be at a high level at the same time to turn on the selection transistors M4 on the first row and the second row. After performing AD conversion of the focus detection signals on the first row and the second row, respectively, the comparators A1 and A2 performs AD conversion of the image signals, respectively. The image signals and the focus detection signals are read out on the first row to the fourth row in one frame by the above operations.

Subsequently, the second mode for reading out only the image signal will be described. The control circuit 4 causes the control signals PWR1, PWR3, and PWR4 to be at a high level and the control signal PWR2 to be at a low level. The comparator A2 is in a non-operating state, and the comparator A1 is ready to sequentially perform AD conversion of the image signals for one row. Further, since the comparator A2 is not used, the control circuit 4 causes the control signal VLON2 to be at a low level to turn off the transistor switch M42. The control circuit 4 switches the control signals VLON1 and VLON1B every sequential readout on a row basis. The second operation mode will be described below by using FIG. 18.

Figure 18:
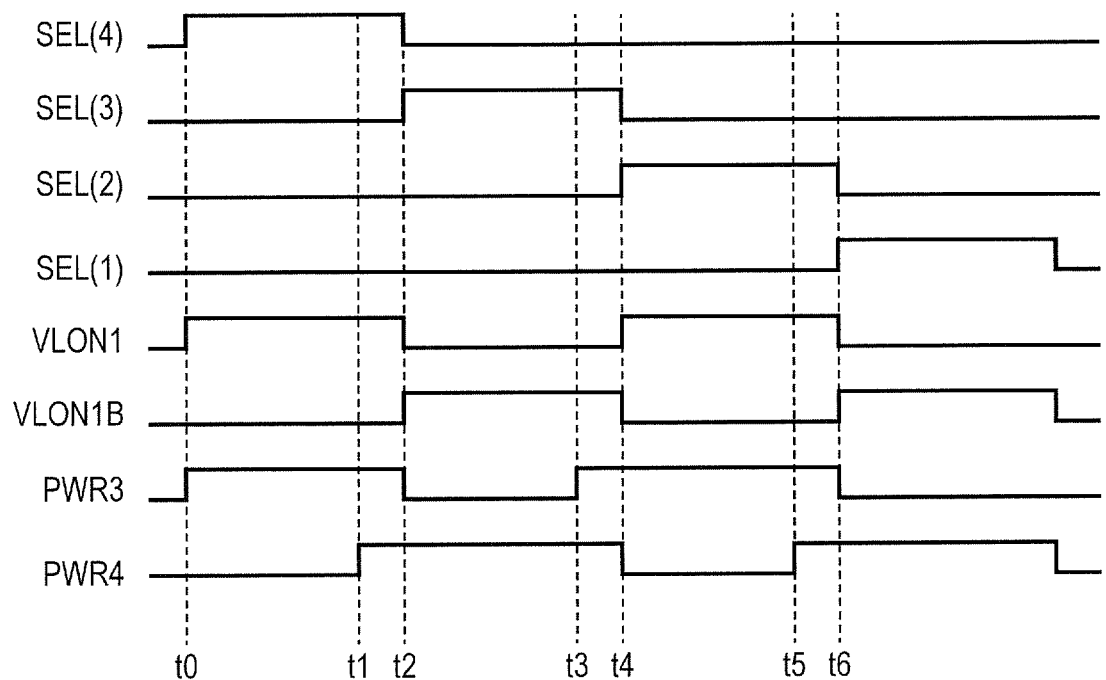
FIG. 18 is a timing chart of an imaging device of the tenth embodiment.

FIG. 18 is a timing chart of the imaging device of the present embodiment and illustrates the mode for reading out only the image signal. At the time t0, the vertical scanning circuit 2 outputs a high-level drive pulse SEL(4) to select the pixel 10 on the fourth row. Further, the control circuit 4 outputs a high-level control signal VLON1 and a low-level control signal VLON1B. The transistor switch M40 enters an off-state, and the transistor switch M41 enters an on-state. Thus, the image signal of the pixel 10 on the fourth row is input to the comparator A1 via the column signal line L1 and the transistor switch M41 and subjected to AD conversion.

At the time t1, the control circuit 4 changes the control signal PWR4 from a low level to a high level to cause the current source 161 to enter an operating state. At the time t2, the vertical scanning circuit 2 outputs a low-level drive pulse SEL(4) and a high-level drive pulse SEL(3), and thereby the pixel 10 on the third row is selected. Further, the control signal PWR3 changes to a low level, and the current source 160 enters a non-operating state. The levels of the control signals VLON1 and VLON1B are inverted, the transistor switch M40 enters an on-state, and the transistor switch M41 enters an off-state. Thereby, the image signal of the pixel 10 on the third row is input to the comparator A1 via the column signal line L2 and the transistor switch M40 and subjected to AD conversion.

At the time t3, the control signal PWR3 changes to a high level, and the current source 160 enters an operating state. At the time t4, the pixel 10 on the second row is selected to be ready to output an image signal. The levels of the control signals VLON1 and VLON1B are inverted, and the image signal of the pixel 10 on the second row is input to the comparator A1 via the column signal line L1 and the transistor switch M41 and subjected to AD conversion. Subsequently, in the same manner, the current source 161 enters an operating state at the time t5, and the image signal on the first row is read out to the comparator A1 via the column signal line L2 and the transistor switch M40 and subjected to AD conversion on and after the time t6.

As described above, the image signal is read out from the column signal line L1 during the time t0 to t2 and t4 to t6, and the image signal is read out from the column signal line L2 after the time t2 to t4 and t6. Thus, the current source 160 is in a non-operating state during the time t0 to t2 and t4 to t6, and the current source 161 is in a non-operating state after the time t2 to t4 and t6, which allows for power reduction. Further, the control circuit 4 switches the control signal PWR4 from a low level to a high level at the time t0 before the time t2 and at the time t4 before the time t6. Similarly, the control circuit 4 switches the control signal PWR3 from a low level to a high level prior to a readout operation. Thereby, readout can be performed after the operations of the current sources 160 and 161 are stabilized.

As discussed above, when readout of the focus detection signal is not performed and readout of only the image signal is performed within a reduced time period, the comparator A1 is configured so as to be able to perform AD conversion on image signals on all the rows. At this time, power consumption can be reduced by causing only the comparator A2 to enter a non-operating state. Further, also in the present embodiment, while reducing the circuit size, it is possible to switch the operation between the operation when reading out only the image signal and the operation when reading out the focus detection signal together.

In the present embodiment, compared to the sixth embodiment, the selection transistor M4B and the control line of the drive pulse SEL2 of the pixel 10 can be reduced, which is advantageous in the pixel characteristics. On the other hand, while both the column signal lines L1 and L2 are used in readout of the image signal in the present embodiment, only the column signal line L1 is used in the sixth embodiment. In this regard, the sixth embodiment is more likely to achieve reduction in power consumption than the present embodiment. As described above, however, the present embodiment can have power consumption close to the power consumption corresponding to one column signal line by switching the current sources 160 and 161 to enter an operating state on a row basis.

Note that, also in the present embodiment, inverting amplifier circuits may be provided on the pre-stage of the comparators A1 and A2 in the same manner as the fourth, fifth, and eighth embodiments. Further, source followers may be provided between the signal line of the RAMP signal generation circuit 401 and the inverting input terminals of the comparators A1 and A2.

Eleventh Embodiment

Figure 19:
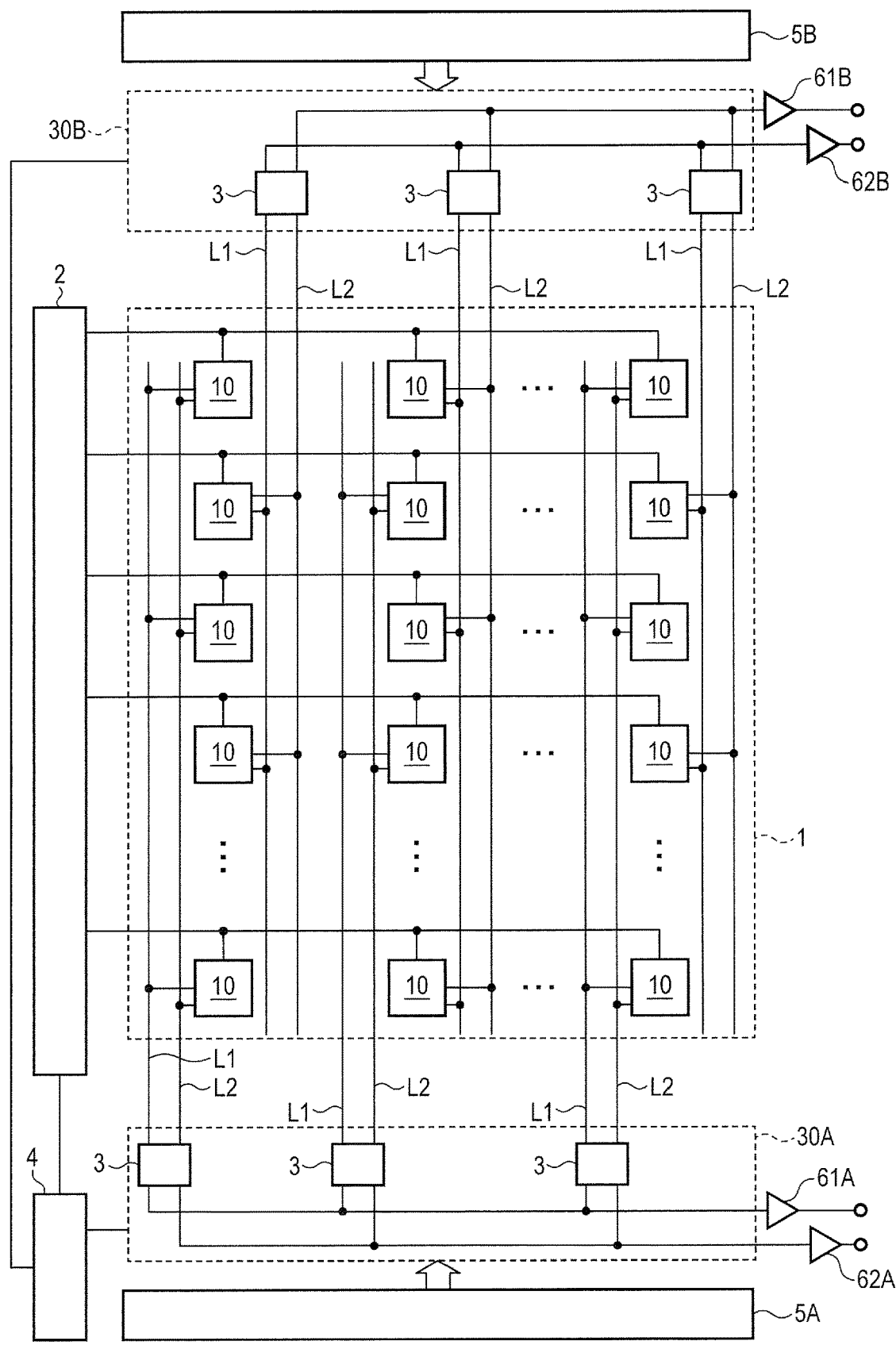
FIG. 19 is a block diagram of an imaging device of an eleventh embodiment.

FIG. 19 is a block diagram of an imaging device of the present embodiment. While the imaging devices of the first to tenth embodiments have two column signal lines L1 and L2 per column, the number of column signal lines is not limited in particular. For example, as illustrated in FIG. 19, four column signal lines may be provided per column, and column circuit units 30A and 30B, horizontal scanning circuits 5A and 5B, signal processing circuits 61A and 61B, and signal processing circuits 62A and 62B that form a pair on the upper side and the lower side of the pixel unit 1 may be provided, respectively. Furthermore, the number of column signal lines per column may be eight. In such a way, the increased number of the column signal lines per column allows for a faster readout of signals. Note that, also in this case, the column circuit can be controlled in a separate manner in accordance with the readout mode of the image signal and/or the focus detection signal.

Twelfth Embodiment

Figure 20:
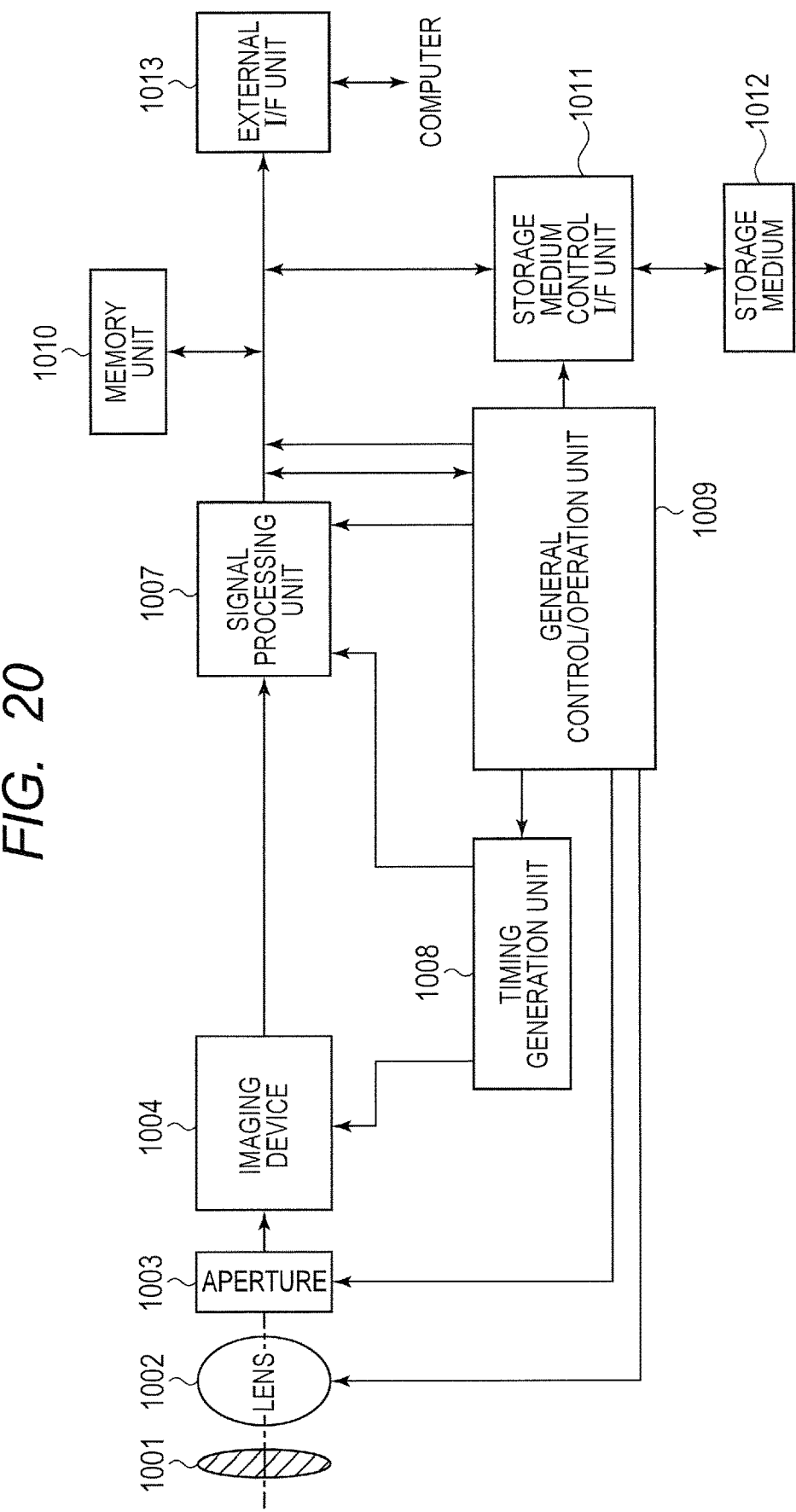
FIG. 20 is a block diagram of an imaging system of a twelfth embodiment.

The imaging device according to the above-described embodiments can be applied to various imaging systems. The imaging system may be a digital still camera, a digital camcorder, a camera head, a copier machine, a fax machine, a mobile phone, an on-vehicle camera, an observation satellite, a surveillance camera, or the like. FIG. 20 illustrates a block diagram of a digital still camera as an example of the imaging system.

The imaging system illustrated in FIG. 20 includes a barrier 1001, a lens 1002, an aperture 1003, an imaging device 1004, a signal processing unit 1007, a timing generation unit 1008, a general control/operation unit 1009, a memory unit 1010, storage medium control I/F unit 1011, a storage medium 1012, and an external I/F unit 1013. The barrier 1001 protects the lens 1002, and the lens 1002 captures an optical image of a subject onto the imaging device 1004. The aperture 1003 changes the amount of a light that has passed through the lens 1002. The imaging device 1004 includes the imaging device of the above-described embodiments and converts an optical image captured by the lens 1002 into image data. In this example, an AD conversion unit is formed on the semiconductor substrate of the imaging device 1004. The signal processing unit 1007 performs various correction or data compression on the captured data output from the imaging device 1004. The timing generation unit 1008 outputs various timing signals to the imaging device 1004 and the signal processing unit 1007. The general control/operation unit 1009 controls the entire digital still camera, and the memory unit 1010 temporarily stores image data. The storage medium control I/F unit 1011 is an interface for recording or reading out image data to or from the storage medium 1012, and the storage medium 1012 is a removable storage medium such as a semiconductor memory for recording or reading out captured data. The external I/F unit 1013 is an interface for communicating with an external computer or the like. A timing signal or the like may be input from the outside of the imaging system, and the imaging system may have at least the imaging device 1004 and the signal processing unit 1007 that processes a captured signal output from the imaging device 1004.

In the present embodiment, the configuration in which the imaging device 1004 and the AD conversion unit are provided on separate semiconductor substrates has been described. However, the imaging device 1004 and the AD conversion unit may be formed on the same semiconductor substrate. Further, the imaging device 1004 and the signal processing unit 1007 may be formed on the same semiconductor substrate.

Further, each of the pixels may include a first photoelectric conversion unit and a second photoelectric conversion unit. The signal processing unit 1007 may be configured to process a signal based on charges generated in the first photoelectric conversion unit and a signal based on charges generated in the second photoelectric conversion unit to acquire distance information on the distance from the imaging device 1004 to a subject.

Thirteenth Embodiment

Figure 21A:
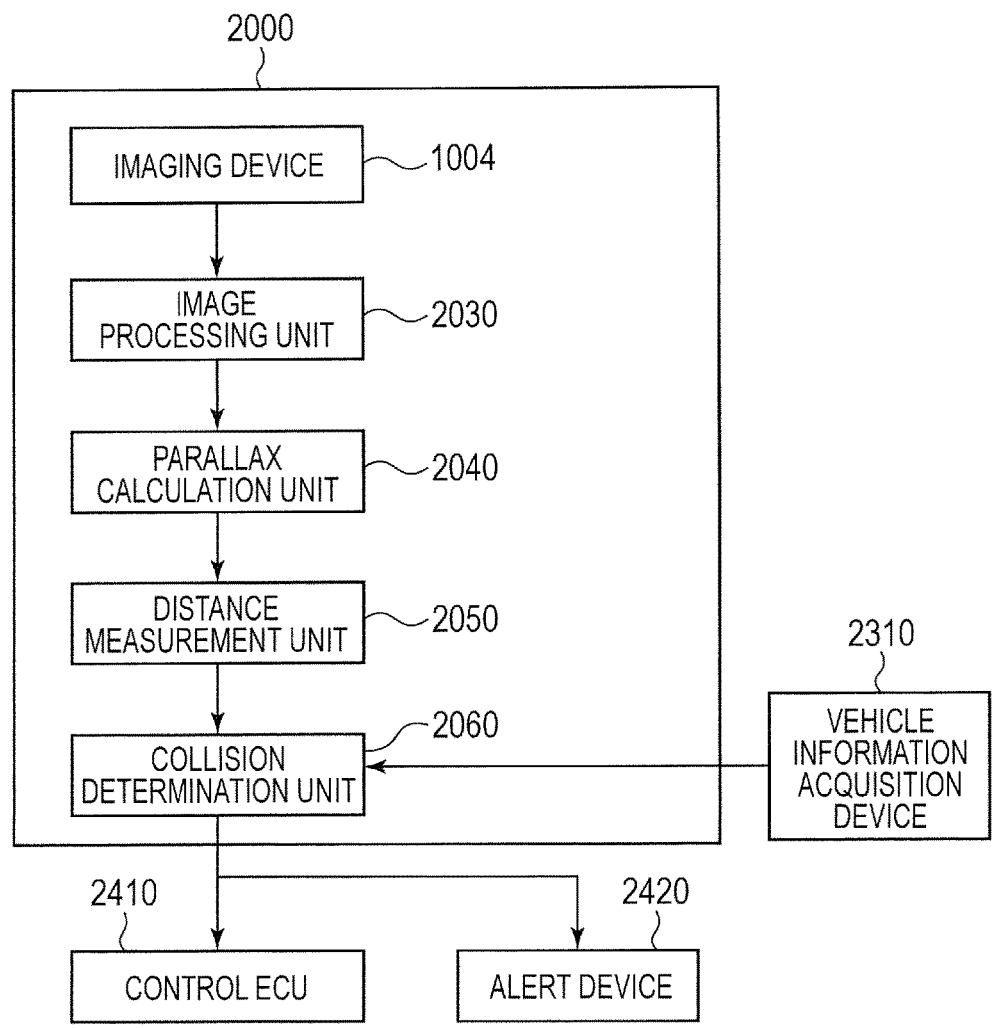
FIG. 21A and FIG. 21B are block diagrams of an imaging system in an on-vehicle camera of a thirteenth embodiment.
Figure 21B:
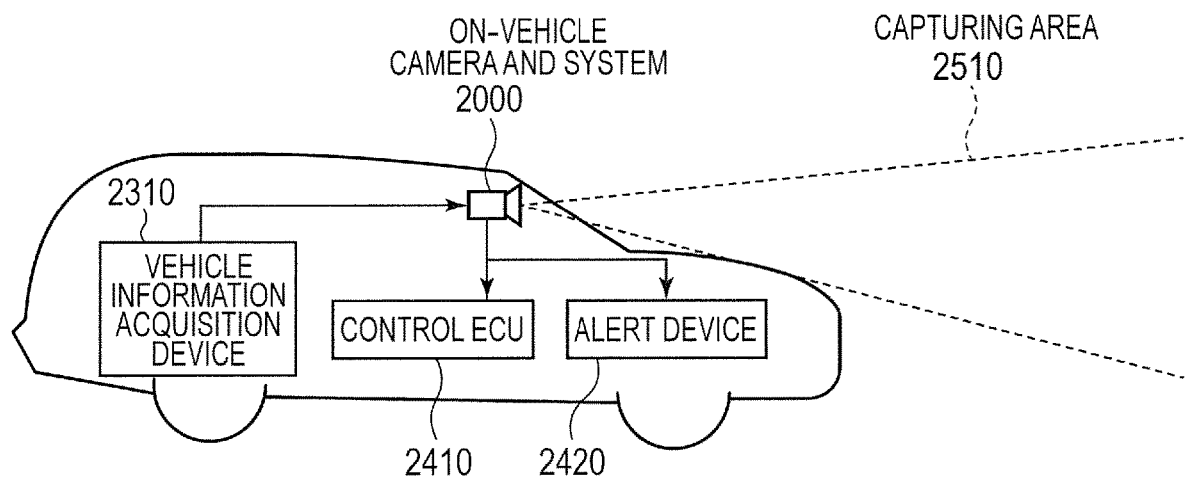

FIG. 21A and FIG. 21B illustrate an example of the imaging system with respect to an on-vehicle camera in a thirteenth embodiment of the present invention. The imaging system 2000 has the imaging device 1004 of the above-described embodiments. The imaging system 2000 has an image processing unit 2030 that performs image processing on a plurality of image data acquired by the imaging device 1004 and a parallax calculation unit 2040 that calculates a parallax (a phase difference of parallax images) from the plurality of image data acquired by the imaging system 2000. Further, the imaging system 2000 has a distance measurement unit 2050 that calculates a distance to the object based on the calculated parallax and a collision determination unit 2060 that determines whether or not there is a collision possibility based on the calculated distance. Here, the parallax calculation unit 2040 and the distance measurement unit 2050 are an example of a distance information acquisition unit that acquires distance information on the distance to the object. That is, the distance information is information on a parallax, a defocus amount, a distance to an object, or the like. The collision determination unit 2060 may use any of the distance information to determine the collision possibility. The distance information acquisition unit may be implemented by dedicatedly designed hardware or may be implemented by a software module. Further, the distance information acquisition unit may be implemented by a field programmable gate array (FPGA) or an application specific integrated circuit (ASIC) or may be implemented by combination thereof.

The imaging system 2000 is connected to the vehicle information acquisition device 2310 and can acquire vehicle information such as a vehicle speed, a yaw rate, a steering angle, or the like. Further, the imaging system 2000 is connected with a control ECU 2410, which is a control device that outputs a control signal for causing a vehicle to generate braking force based on a determination result by the collision determination unit 2060. Further, the imaging system 2000 is connected with an alert device 2420 that issues an alert to the driver based on a determination result by the collision determination unit 2060. For example, when the collision probability is high as the determination result of the collision determination unit 2060, the control ECU 2410 performs vehicle control to avoid a collision or reduce damage by applying a brake, pushing back an accelerator, suppressing engine power, or the like. The alert device 2420 alerts a user by sounding an alert such as a sound, displaying alert information on a display of a car navigation system or the like, providing vibration to a seat belt or a steering wheel, or the like. The imaging system 2000 functions as a control unit adapted to control operations for controlling a vehicle as described above.

In the present embodiment, an area around a vehicle, for example, a front area or a rear area is captured by using the imaging system 2000. FIG. 21B illustrates the imaging system in a case of capturing a front area of a vehicle (a capturing area 2510). The vehicle information acquisition device 2310 as a capturing control unit transmits instructions to the imaging system 2000 or the imaging device 1004 to perform the operation described in the above first to twelfth embodiments. Since the operation of the imaging device 1004 is the same as that in the first to twelfth embodiments, the description thereof will be omitted here. Such a configuration can further improve the ranging accuracy.

Although the example of control for avoiding a collision to another vehicle has been illustrated in the above description, the embodiment is applicable to automatic driving control for following another vehicle, automatic driving control for not going out of a traffic lane, or the like. Furthermore, the imaging system is not limited to a vehicle such as the subject vehicle, and can be applied to a moving unit (moving apparatus) such as a ship, an airplane, or an industrial robot, for example. In addition, the imaging system can be widely applied to any device which utilizes object recognition, such as an intelligent transportation system (ITS), without being limited to moving units.

Other Embodiments

The present invention is not limited to the above-described embodiments, but various modifications are possible. For example, an example in which a part of the features of any of the embodiments is added to another embodiment or an example in which a part of the features of any of the embodiments is replaced with a part of the features of another embodiment may also be an embodiment of the present invention.

In the embodiments described above, while the configuration in which one pixel has two floating diffusion regions for a pair of photoelectric conversion units and the configuration in which one pixel has one floating diffusion region for a pair of photoelectric conversion units have been described, the present invention is not limited thereto. For example, one pixel may have one floating diffusion region for two pairs or four pairs of photoelectric conversion units. Further, a plurality of pixel signals in the vertical direction or the horizontal direction may be added. Furthermore, while the inverting amplifier circuits A11 and A12 each with a single-end input are used on the pre-stage of the comparators A1 and A2 in the fourth, fifth, eighth, and ninth embodiments, differential amplifier circuits or non-inverting amplifier circuits may be used.

While the embodiments described above have been described assuming that each transistor is formed of an N-type transistor, each transistor may be formed of a P-type transistor. In this case, the level of each of the drive signals described above is opposite.

Note that all the above-described embodiments merely illustrate embodied examples in implementing the present invention, and the technical scope of the present invention should not be construed in a limiting sense by these examples. That is, the present invention can be implemented in various forms without departing from its technical idea or its primary feature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-033698, filed Feb. 24, 2017, which is hereby incorporated by reference herein in its entirety.

What is claimed is:

1. An imaging device comprising:
a plurality of pixels arranged in a matrix, each of the plurality of pixels comprising a plurality of photoelectric conversion units;
a plurality of signal lines provided on each column of the plurality of pixels;
a plurality of readout circuits provided on each the column and configured to read out signals based on charges of the plurality of photoelectric conversion units via the plurality of signal lines; and
a control circuit configured to control the plurality of readout circuits associated with one column individually to be an operating state and a non-operating state,
wherein each of the plurality of readout circuits includes a current source,
wherein the control circuit individually controls a current flow of the current source of each of the plurality of readout circuits to set the readout circuit to be the operating state by supplying a first drive current, and set the readout circuit to be the non-operating state by supplying a second drive current lower than the first drive current or by stopping the current flow, and
further comprising a plurality of wirings respectively connected to the current sources of the plurality of readout circuits,
wherein the plurality of wirings are electrically isolated from each other.

2. The imaging device according to claim 1, wherein the plurality of photoelectric conversion units include a pair of a first photoelectric conversion unit and a second photoelectric conversion unit.

3. The imaging device according to claim 1, wherein each of the plurality of readout circuit includes a comparator comprising a first input terminal to which the signal from the pixel is input, a second input terminal to which a reference signal is input, and an output terminal that outputs a comparison result.

4. The imaging device according to claim 3, wherein the reference signal is input to the comparator via a voltage follower.

5. The imaging device according to claim 3,
wherein the signal from the pixel is input to the first input terminal of the comparator via an input capacitor, and a reset switch is provided between the output terminal and the first input terminal of the comparator, and wherein a control signal is supplied to a gate of the reset switch via a control line, and drive circuits that drive the control line are provided to both ends of the control line, respectively.

6. The imaging device according to claim 1, wherein a current source is connected to each of the plurality of signal lines, and
the current source is controlled into an operating state or a non-operating state by the control circuit.

7. The imaging device according to claim 6, wherein each of the readout circuits or the current source is in an operating state before a readout operation of each of the readout circuits is started.

8. The imaging device according to claim 1, wherein the non-operating state is a state in which a drive current supplied to each of the plurality of readout circuits is smaller than that supplied in the operating state.

9. An imaging system comprising:
the imaging device according to claim 1; and
a signal processing device that processes image signals output from the imaging device.

10. The imaging system according to claim 9,
wherein the imaging device has a plurality of pixels arranged in a matrix,
wherein each of the plurality of pixels includes the two photoelectric conversion units, and
wherein the signal processing device processes the image signals generated by the two photoelectric conversion units, respectively, and acquires information on a distance from the imaging device to a subject.

11. An imaging device comprising:
a plurality of pixels arranged in a matrix, each of the plurality of pixels comprising a plurality of photoelectric conversion units;
a plurality of signal lines provided on each column of the plurality of pixels;
a plurality of readout circuits provided on each the column and configured to read out signals based on charges of the plurality of photoelectric conversion units via the plurality of signal lines; and
a control circuit configured to control the plurality of readout circuits associated with one column individually to be an operating state and a non-operating state,
wherein the plurality of photoelectric conversion units include a pair of a first photoelectric conversion unit and a second photoelectric conversion unit, and
wherein the plurality of readout circuits associated with one column include a first readout circuit configured to read out an addition signal obtained by adding signals of the first photoelectric conversion unit and the second photoelectric conversion unit and a second readout circuit configured to read out either one of a signal of the first photoelectric conversion unit or a signal of the second photoelectric conversion unit.

12. The imaging device according to claim 11, wherein the second readout circuit further reads out the addition signal.

13. The imaging device according to claim 11,
wherein the plurality of signal lines include a first signal line and a second signal line, and
wherein each of the plurality of pixels comprises a first amplification transistor that outputs a first signal based on charges of the first photoelectric conversion unit to the first signal line and a second amplification transistor that outputs a second signal based on charges of the second photoelectric conversion unit to the second signal line.

14. The imaging device according to claim 13, wherein the first readout circuit and the second readout circuit add the first signal output to the first signal line and the second signal output to the second signal line.

15. The imaging device according to claim 14, wherein each of the first readout circuit and the second readout circuit adds the first signal and the second signal output from same one of the pixels.

16. The imaging device according to claim 11, wherein the plurality of pixels are arranged divided into a plurality of regions, and the control circuit controls an operating state and a non-operating state of the second readout circuit into for each of the regions.

17. The imaging device according to claim 11,
wherein the plurality of signal lines comprises a first signal line and a second signal line, and
wherein each of the pixels comprises an amplification transistor electrically connected in common to the first photoelectric conversion unit and the second photoelectric conversion unit, a first selection transistor provided between the amplification transistor and the first signal line, and a second selection transistor provided between the amplification transistor and the second signal line.

18. The imaging device according to claim 17, wherein the amplification transistor outputs at least one of:
a first signal based on charges of the first photoelectric conversion unit,
a second signal based on charges of the second photoelectric conversion unit, and
an addition signal obtained by adding charges of the first photoelectric conversion unit and charges of the second photoelectric conversion unit.

19. The imaging device according to claim 18, wherein the imaging device is configured to perform switching a first operation mode and a second operation mode,
in the first operation mode,
the first readout circuit reads out the addition signal after reading out the first or second signal via the first signal line from one of the pixels on a first row, and
the second readout circuit reads out the addition signal after reading out the first or second signal via the second signal line from one of the pixels on a second row different from the first row, and
in the second operation mode, the first readout circuit reads out the addition signal via the first signal line from the pixels on a row basis.

20. The imaging device according to claim 19, wherein, in the second operation mode, the control circuit controls the second readout circuit into a non-operating state.

21. The imaging device according to claim 19, wherein a time period allotted to a readout operation on a row basis in the first operation mode is an integral multiple of a time period allotted to a readout on a row basis in the second operation mode.

22. The imaging device according to claim 19, wherein the first operation mode and the second operation mode are switched on a frame basis.

23. The imaging device according to claim 11,
wherein the plurality of signal lines comprises a first signal line and a second signal line, and
wherein each of the pixels comprises an amplification transistor electrically connected in common to the first photoelectric conversion unit and the second photoelectric conversion unit and a selection transistor provided between the amplification transistor and one of the first signal line and the second signal line.

24. The imaging device according to claim 23, wherein the amplification transistor outputs at least one of:
a first signal based on charges of the first photoelectric conversion unit,
a second signal based on charges of the second photoelectric conversion unit and
an addition signal obtained by adding charges of the first photoelectric conversion unit and charges of the second photoelectric conversion unit.

25. The imaging device according to claim 24, wherein the imaging device is configured to perform switching a first operation mode and a second operation mode,
in the first operation mode,
the first readout circuit reads out the addition signal after reading out the first or second signal via the first signal line from one of the pixels on a first row, and
the second readout circuit reads out the addition signal after reading out the first or second signal via the second signal line from one of the pixels on a second row different from the first row, and
in the second operation mode, the first readout circuit reads out the addition signal via the first signal line from the pixels on a row basis.

26. The imaging device according to claim 25, wherein, in the second operation mode, the control circuit controls the second readout circuit into a non-operating state.

27. The imaging device according to claim 25, wherein a time period allotted to a readout operation on a row basis in the first operation mode is an integral multiple of a time period allotted to a readout on a row basis in the second operation mode.

28. The imaging device according to claim 25, wherein the first operation mode and the second operation mode are switched on a frame basis.

29. The imaging device according to claim 23, wherein the selection transistor of the pixels on a first row is connected to the first signal line, and the selection transistor of the pixels on a second row is connected to the second signal line.

30. The imaging device according to claim 23 further comprising a switch circuit that switches connection of the first signal line and the second signal line to the first readout circuit and the second readout circuit on a row basis.

31. The imaging device according to claim 11,
wherein the first readout circuit comprises a first amplifier circuit,
wherein the second readout circuit comprises a second amplifier circuit, and
wherein the control circuit individually controls a gain of the first amplifier circuit and a gain of the second amplifier circuit.

32. The imaging device according to claim 11,
wherein each of the plurality of readout circuits includes a current source, and
wherein the control circuit individually controls the current source of each of the plurality of readout circuits.

33. The imaging device according to claim 32 further comprising a plurality of wirings respectively connected to the current sources of the plurality of readout circuits,
wherein the plurality of wirings are electrically isolated from each other.

* * * * *